United States Patent
Inagaki et al.

(10) Patent No.: US 6,908,161 B2
(45) Date of Patent: Jun. 21, 2005

(54) ANTILOCK BRAKE CONTROL SYSTEM FOR VEHICLE

(75) Inventors: Hiromi Inagaki, Wako (JP); Masaru Gotoh, Wako (JP); Hidetoshi Kobori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/715,128

(22) Filed: Nov. 18, 2003

(65) Prior Publication Data

US 2004/0150260 A1 Aug. 5, 2004

(30) Foreign Application Priority Data

Nov. 18, 2002 (JP) ........................................ 2002-333884
Nov. 18, 2002 (JP) ........................................ 2002-333885
Dec. 20, 2002 (JP) ........................................ 2002-369988

(51) Int. Cl.⁷ .............................. B60T 8/32; B60T 8/26; B60T 8/64; B60T 8/34
(52) U.S. Cl. .................................... 303/119.2; 303/199
(58) Field of Search .................... 303/119.2, 119.3, 303/199, 113.1, DIG. 8, 156, 157, 158; 701/73, 71, 80, 83, 70; 251/129.01, 129.15, 129.05; 137/487.5, 596.17; 361/152

(56) References Cited

U.S. PATENT DOCUMENTS 5,823,640 A * 10/1998 Eichhorn et al. ......... 303/119.2
6,381,531 B1 * 4/2002 Schmidt .................... 701/73
2003/0025390 A1 * 2/2003 Inagaki et al. ............ 303/199
2004/0150260 A1 * 8/2004 Inagaki et al. ........... 303/113.1

FOREIGN PATENT DOCUMENTS

| DE | 10353067 | * 6/2004 |
|---|---|---|
| JP | 10-504259 | 4/1998 |
| JP | 2000-504291 | 4/2000 |
| JP | 2001-48000 | 2/2001 |

* cited by examiner

Primary Examiner—Douglas C. Butler
(74) Attorney, Agent, or Firm—Arent Fox, PLLC

(57) ABSTRACT

An antilock brake control system for a vehicle including normally-opened solenoid valves, normally-closed solenoid valves, and diodes. Each of the normally-opened solenoid valves is switched over among a turned-on state in which a predetermined first electric current is permitted to flow through the coil, a turned-off state in which the supply of the electric current to the coil is topped, and a middle state in which a second electric current lower than the first electric current is permitted to flow. In addition, the system includes a switch that is maintained in an electrically disconnecting state during shifting of each of the normally-opened solenoid valves from the turned-on state to the middle state, until the shifting is completed.

5 Claims, 16 Drawing Sheets

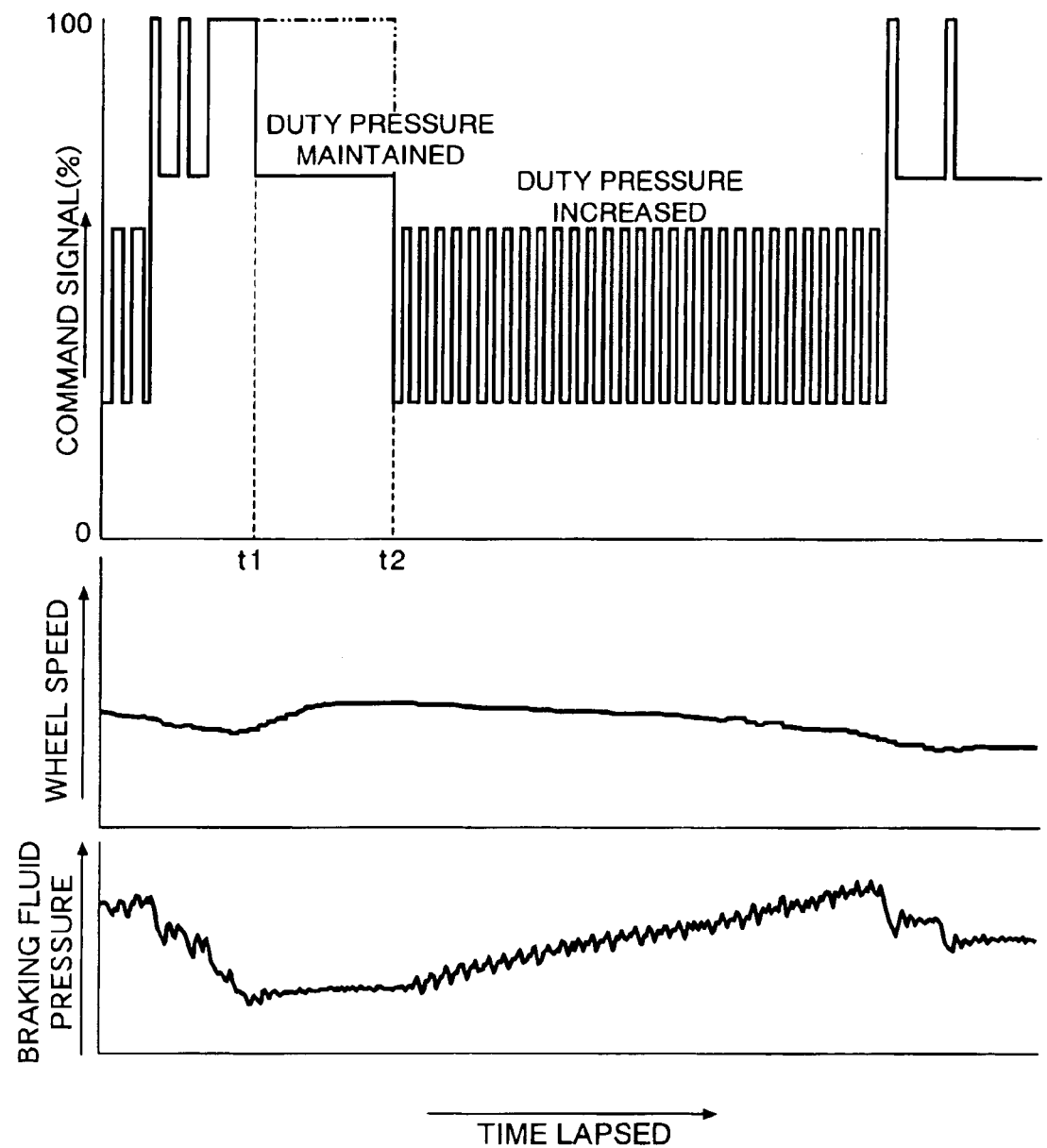

ANTILOCK BRAKE CONTROL SYSTEM FOR VEHICLE

BACKGROUND OF THE INVENTION

1. Field of the Invention

The present invention relates to an antilock brake control system for a vehicle, including normally-opened solenoid valves and normally-closed solenoid valves corresponding wheel brakes, and a diode capable of exhibiting a function of slowly decreasing electric current supplied to a coil of each of the normally-opened solenoid valves when the supply of the electric current to the coil has been cut off.

2. Description of the Related Art

There is an antilock brake control system for a vehicle already known, for example, from Published Japanese Translation No. 10-504259 of PCT Application No. PCT/DE/00588 and the like, in which a diode is connected in parallel to a coil of each of normally-opened solenoid valves in order to the suppress the generation of a noise upon closing/seating of each of the normally-opened solenoid valves.

The diode is adapted to slowly decrease the electric current flowing through the coil when the supply of the electric current to the coil has been stopped. When each of the normally-opened solenoid valves is adapted to be controlled in a turning-on/off manner, and it is also controlled at an electric current having a middle value between a turning-on value and a turning-off value, it is possible to stabilize the middle current value. However, when the control mode is changed from a turned-on state to a middle current value state, the change in electric current is slow, so that the response is retarded. Therefore, in a technique disclosed in the above Published Japanese Translation No. 10-504259, when the control mode is changed from the turned-on state to the middle current value state, it is changed from the turned-on state via a turned-off state to the middle current value state. However, the response is inevitably retarded, because the turned-off state exists in the middle.

There is also a conventionally known antilock brake control system for a vehicle, in which braking fluid pressures are controlled independently for front wheels and rear wheels. In such an antilock brake control system, a braking load on the side of the front wheels becomes larger than that on the side of the rear wheels due to a change in load during braking. Thus, it is desired that the responsiveness during the antilock brake control is higher on the side of the front wheels than that on the side of the rear wheels.

Further, there is an antilock brake control system for a vehicle already known, for example, from Published Japanese Translation No. 2000-504291 of PCT Application No. PCT/DE97/02783 and Japanese Patent Application Laid-open No. 2001-48000, in which select-low controls are carried out simultaneously for left and right rear wheels in order to ensure the stability of the vehicle during an antilock brake control.

If a capacity of a diode is set at a relatively large value, there is an effect in respect of the stabilization of an electric current. However, if the select-low controls are carried out simultaneously for the left and right rear wheels, an imbalance may be generated in some case between braking pressures of the left and right rear wheel brakes due to a difference between the capacities of diodes individually corresponding to the left and right rear wheels and a difference between inductances of coils individually corresponding to the left and right rear wheels. Moreover, there is a possibility that the imbalance is generated significantly by a reduction in responsiveness due to a larger capacity of the diode.

SUMMARY OF THE INVENTION

Accordingly, it is a first object of the present invention to enhance the responsiveness during shifting of each of normally-opened solenoid valves from a turned-on state to a middle state in an antilock brake control system. It is a second object of the present invention to enhance the responsiveness of the control for front wheels receiving a heavy load in an antilock brake control system designed so that braking fluid pressures are controlled independently for front wheels and rear wheels. Further, it is a third object of the present invention to suppress the generation of an imbalance between braking pressures of left and right rear wheels brakes in an antilock brake control system designed so that select-low controls are carried out simultaneously for left and right rear wheels.

To achieve the above first object, according to a first feature of the present invention, there is provided an antilock brake control system for a vehicle, comprising: normally-opened solenoid valves interposed between wheel brakes and a braking fluid pressure generating means; normally-closed solenoid valves interposed between the wheel brakes and reservoirs; current supply control means connected in series to coils of the normally-opened solenoid valves to control the supply of electric current to the coils; diodes which bypass the coils and which connect the current supply control means and an earth to each other or connect a power source and the current supply control means to each other, while permitting the flowing of the electric current toward the power source; wheel speed sensors for detecting wheel speeds; and an antilock control means adapted to determine a tendency in the locking of each wheel based on wheel speeds detected by the wheel speed sensors and to control the supply of electric current to the normally-opened solenoid valves and the normally-closed solenoid valves in accordance with the result of the determination; the antilock control means being adapted to switch the state of each of the normally-opened solenoid valves over a turned-on state in which a predetermined first electric current is permitted to flow through the coil, a turned-off state in which the supply of the electric current to the coil is stopped, and a middle state in which a second electric current lower than the first electric current is permitted to flow through the coil, in the control of the supply of the electric current to the normally-opened solenoid valves, wherein the antilock brake control system further includes a switch means which is mounted between the diode and the current supply control means or between the diode and the earth, and whose electrical connecting and disconnecting operations are controlled by the antilock control means, and the antilock control means is adapted to maintain the switch means in an electrically disconnecting state during shifting of each of the normally-opened solenoid valves from the turned-on state to the middle state, until the shifting is completed.

With such arrangement of the first feature, the function of the diode can be substantially invalidated by bringing the switch means into the electrically disconnecting state, and when the control mode is changed from the turned-on state to a middle electric current value state, the responsiveness during shifting of each of the normally-opened solenoid valves from the turned-on state to the middle state can be enhanced by bringing the switch means into the electrically disconnecting state to invalidate the function of the diode.

To achieve the above second object, according to a second feature of the present invention, there is provided an antilock brake control system for a vehicle, comprising: normally-opened solenoid valves which are interposed between wheel brakes respectively mounted on front wheels and rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves independently for the front wheels and the rear wheels in accordance with the result of the determination, wherein a switch means is connected in series to only the diodes which correspond to the normally-opened solenoid valves for the front wheels among the diodes individually corresponding to the normally-opened solenoid valves.

With such arrangement of the second feature, the switch means is connected in series to only the diodes corresponding to the front wheels, and hence the responsiveness of the control of braking fluid pressures for the front wheels receiving a heavy load can be enhanced by bringing the switch means into a turned-off state as required to substantially invalidate the function of the diode, while minimizing an increase in the number of circuits for a signal output from the antilock control means.

To achieve the second object, according to a third feature of the present invention, there is provided an antilock brake control system for a vehicle, comprising: normally-opened solenoid valves which are interposed between wheel brakes respectively mounted on front wheels and rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves independently for the front wheels and the rear wheels in accordance with the result of the determination, wherein the diode corresponding to each of the normally-opened solenoid valves for the front wheels has a capacity which is set at a value smaller than that of the diode corresponding to each of the normally-opened solenoid valves for the rear wheels.

With such arrangement of the third feature, the capacity of the diode on the side of the front wheels is set at the relatively small value. Therefore, in the coils of the normally-opened solenoid valves corresponding to the front wheels, an electric current decreasing rate is high as compared with the diode having a larger capacity, when the electric current flowing through the coils is slowly decreased by the diode upon stoppage of the supply of the electric current to the coils. Thus, it is possible to enhance the responsiveness of the control of the braking fluid pressures for the front wheels receiving a heavy load.

To achieve the third object, according to a fourth feature of the present invention, there is provided an antilock brake control system for a vehicle, comprising: normally-opened solenoid valves which are interposed between wheel brakes respectively mounted on left and right front wheels and left and right rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves in such a manner to simultaneously carry out select-low controls for the left and right rear wheels in accordance with the result of the determination, wherein a switch means is connected in series to only those of the diodes individually corresponding to the normally-opened solenoid valves which individually correspond to the left and right rear wheels.

With such arrangement of the fourth feature, the switch means is connected in series to only the diodes individually correspond to the left and right rear wheels. Therefore, it is possible to enhance the responsiveness of the control of braking pressures of the left and right rear wheel brakes and to suppress the generation of an imbalance between the braking pressures of the left and right rear wheel brakes by bringing the switch means into a turned-off state as required to invalidate the function of the diodes, while minimizing an increase in the number of circuits for a signal output from the antilock control means.

Further, to achieve the third object, according to a fifth feature of the present invention, there is provided an antilock brake control system for a vehicle, comprising: normally-opened solenoid valves which are interposed between wheel brakes respectively mounted on left and right front wheels and left and right rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves in such a manner to simultaneously carry out select-low controls for the left and right rear wheels in accordance with the result of the determination, wherein each of the diodes individually corresponding to the normally-opened solenoid valves for the left and right rear wheels has a capacity which is set at a value smaller than that of each of the diodes individually corresponding to the normally-opened solenoid valves for the left and right front wheels.

With such arrangement of the fifth feature, the capacity of each of the diodes on the side of the left and right rear wheels is set at the relatively small value. Therefore, in the coils of the normally-opened solenoid valves corresponding the left and right rear wheel brakes, an electric current decreasing rate is high as compared with the diode having a larger capacity, when the electric current flowing through the coils is slowly decreased by the diode upon stoppage of the supply of the electric current to the coils. Moreover, a difference between the capacities of the diodes individually corresponding to the left and right rear wheels also becomes small, so that it is possible to suppress the generation of an imbalance between the braking fluid pressures of the left and right rear wheel brakes.

The above and other objects, features and advantages of the invention will become apparent from the following description of the preferred embodiments taken in conjunction with the accompanying drawings.

BRIEF DESCRIPTION OF THE DRAWINGS

FIGS. 1 to 8 show a first embodiment of the present invention, wherein

FIG. 1 is a diagram of a braking fluid pressure circuit of a brake device in a vehicle;

FIG. 2 is a vertical sectional view of a normally-opened solenoid valve;

FIG. 3 is a diagram showing a change in attracting force with respect to a change in stroke of a valve shaft;

FIG. 4 is a bock diagram showing the arrangement of a control system;

FIG. 5 is a flow chart showing a procedure for an antilock brake control conducted by an antilock control means;

FIG. 6 is a diagram showing the arrangement of a drive circuit for a normally-opened solenoid valve;

FIG. 7 is a timing chart showing a command signal to the normally-opened solenoid valves, a wheel speed and a braking fluid pressure in correspondence to one another.

FIGS. 9 to 11 show a second embodiment of the present invention, wherein FIG. 9 is a block diagram showing the arrangement of a control system;

FIG. 10 is a diagram showing the arrangement of a drive circuit for normally-closed solenoid valves corresponding to rear wheels; and FIG. 11 is a diagram showing the arrangement of a drive circuit for normally-closed solenoid valves corresponding to front wheels.

FIGS. 13 to 15 show a fourth embodiment of the present invention, wherein FIG. 13 is a block diagram showing the arrangement of a control system;

FIG. 14 is a diagram showing the arrangement of a drive circuit for normally-closed solenoid valves corresponding to front wheels; and FIG. 15 is a diagram showing the arrangement of a drive circuit for normally-closed solenoid valves corresponding to rear wheels.

DESCRIPTION OF THE PREFERRED EMBODIMENTS

A first embodiment of the present invention will now be described with reference to FIGS. 1 to 8.

Figure 1:
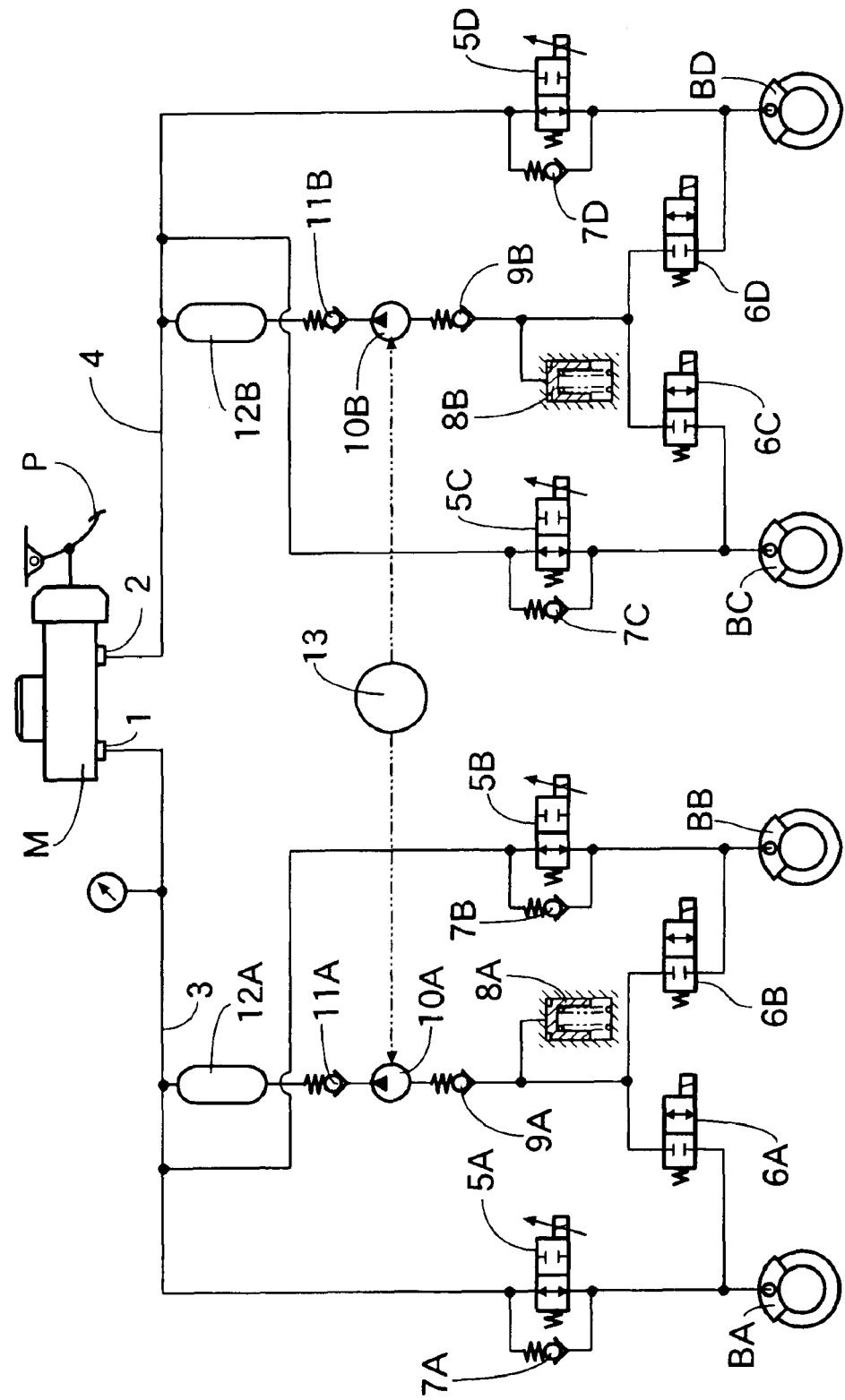

Referring first to FIG. 1, a tandem-type master cylinder M as a braking fluid pressure generating means includes first and second output ports 1 and 2 adapted to generate a braking fluid pressure corresponding to a depressing force applied to a brake pedal by a vehicle driver. First and second output fluid pressure passages 3 and 4 are connected to the first and second output ports 1 and 2, respectively.

Normally-opened solenoid valves 5A and 5B are interposed between the first output fluid pressure passage 3 and a left front wheel brake BA and a right rear wheel brake BB mounted on a left front wheel and a right rear wheel respectively to individually correspond to the left front wheel brake BA and the right rear wheel brake BB. Normally-opened solenoid valves 5C and 5D are interposed between the second output fluid pressure passage 4 and a right front wheel brake BC and a left rear wheel brake BD mounted on a right front wheel and a left rear wheel respectively, to individually correspond to the right front wheel brake BC and the left rear wheel brake BD.

Normally-closed solenoid valves 6A and 6B individually corresponding to the left front wheel brake BA and the right rear wheel brake BB are interposed between the left front wheel brake BA and the right rear wheel brake BB and a single first reservoir 8A corresponding to the first output fluid pressure passage 3, respectively. Normally-closed solenoid valves 6C and 6D individually corresponding to the right front wheel brake BC and the left rear wheel brake BD are interposed between the right front wheel brake BC and the left rear wheel brake BD and a single first reservoir 8B corresponding to the second output fluid pressure passage 4, respectively.

Check valves 7A to 7D for permitting the flowing of a braking fluid from the corresponding wheel brakes BA to BD to the master cylinder M are connected in parallel to the normally-opened solenoid valves 5A to 5D, respectively.

A first pump 10A capable of drawing up the braking fluid from the first reservoir 8A is connected at its inlet side to the first reservoir 8A through a first inlet valve 9A, and at its discharge side to the first output fluid pressure passage 3 through a first delivery valve 11A and a first damper 12A. A second pump 10B capable of drawing up the braking fluid from the second reservoir 8B is connected at its inlet side to the second reservoir 8B through a second inlet valve 9B, and connected at its discharge side to the second output fluid pressure passage 4 through a second delivery valve 11B and a second damper 12B. Moreover, the first and second pumps 10A and 10B are driven commonly by a single electric motor 13.

In such a brake system, upon an ordinary braking free from a possibility that the wheels are locked, the normally-closed solenoid valves 6A to 6D are maintained in closed states due to the non-supply of the electric current, and the normally-opened solenoid valves 5A to 5D are maintained in opened states due to the non-supply of the electric current. As a result, the braking fluid pressure output from the first output port 1 of the master cylinder M is applied to the left front wheel brake BA through the normally-opened solenoid valve 5A, and also applied to the right rear wheel brake BB through the normally-opened solenoid valve 5B. In addition, the braking fluid pressure output from the second output port 2 of the master cylinder M is applied to the right front wheel brake BC through the normally-opened solenoid valve 5C, and also applied to the left rear wheel brake BD through the normally-opened solenoid valve 5D.

When a wheel is about to enter the locked state during the braking, one of the normally-opened solenoid valves 5A to 5D corresponding to the wheel about to enter the locked state is closed by the supply of the electric current thereto, and one of the normally-closed solenoid valves 6A to 6D corresponding to such wheel is opened by the supply of the electric current thereto. Thus, a portion of the braking fluid pressure for the wheel about to enter the locked state is drawn into the first reservoir 8A or the second reservoir 8B, whereby the braking fluid pressure for the wheel about to enter the locked state is reduced.

To maintain the braking fluid pressure constant, the normally-opened solenoid valves 5A to 5D are closed by the supply of the electric current thereto, and the normally-closed solenoid valves 6A to 6D are closed by the non-supply of the electric current thereto. To increase the braking fluid pressure, the normally-opened solenoid valves 5A to 5D linearly control the fluid pressure downstream from them in accordance with an electric current applied to the normally-opened solenoid valves 5A to 5D by controlling such electric current in a state in which the normally-closed solenoid valves 6A to 6D are in the closed states by the non-supply of the electric current thereto.

The first and second pumps 10A and 10B are controlled so that they are operated during an antilock brake control. The braking fluid in the first and second reservoirs 8A and 8B is returned to the master cylinder M by the first and second pumps 10A and 10B. Thus, the return of the braking fluid can prevent an increase in the amount of depression of a brake pedal P due to the drawing of the braking fluid to the first and second reservoir 8A and 8B. Moreover, the pulsations of the pressures discharged from the first and second reservoir 8A and 8B are absorbed by the first and second dampers 12A and 12B, so that the feeling of operation of the brake pedal P cannot be deteriorated by the returning of the braking fluid.

In this way, during the antilock brake control, the normally-closed solenoid valves 6A to 6D are controlled in a turned-on/off manner, and the normally-opened solenoid valves 5A and 5D are controlled in a turned-on/off manner, and also controlled at an electric current having a middle value between a turning-on value and a turning-off value. Among the normally-opened solenoid valves 5A to 5D constructed to linearly change the fluid pressures for the wheel brakes BA to BD, the construction of the normally-opened solenoid valve 5A will be described below with reference to FIG. 2.

Figure 2:
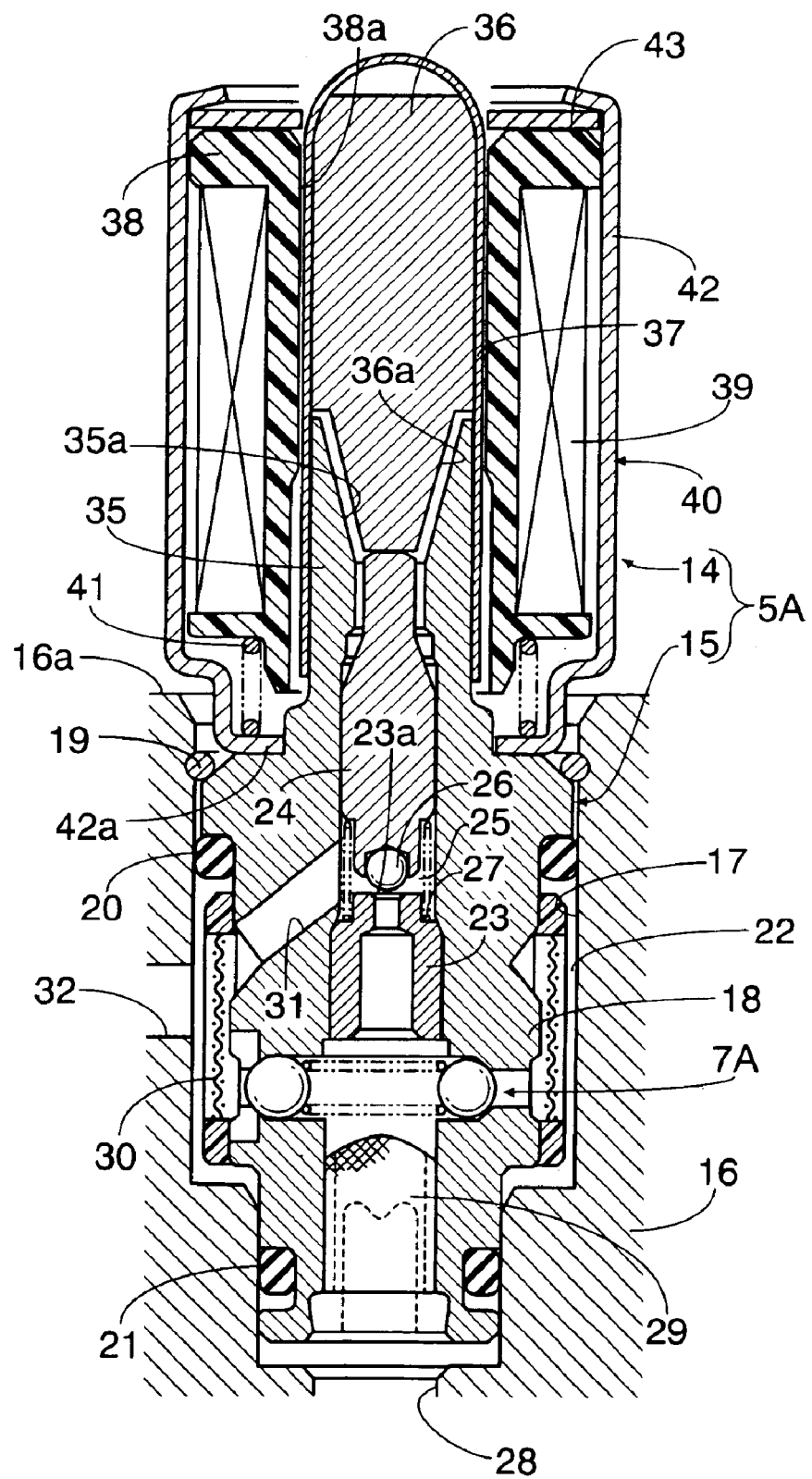

Referring to FIG. 2, the normally-opened solenoid valve 5A is comprised of a solenoid section 14 adapted to exhibit an electromagnetic force, and a valve section 15 driven by the solenoid section 14. The valve section 15 is accommodated in a mounting bore 17 which is provided in a fixed support block 16 to open into one surface 16a of the support block 16. The solenoid section 14 protrudes from the one surface 16a of the support block 16.

The valve section 15 includes a valve housing 18 formed of a magnetic metal into a stepped cylindrical shape. The valve housing 18 is fitted into the mounting bore 17 in the support block 16. A retaining ring 19 is fitted to an inner surface of the mounting bore 17 at a location closer to an open end of the mounting bore 17 and engaged with the valve housing 18 to inhibit the separation of the valve housing 18 from the mounting bore 17. Annular seal members 20 and 21 are mounted to an outer surface of the valve housing 18 at two points axially spaced apart from each other. An annular chamber 22 is defined between the support block 16 and the valve housing 18 and between the seal members 20 and 21.

A cylindrical valve seat member 23 is press-fitted into and secured in the valve housing 18. A valve shaft 24 made of a non-magnetic material is slidably fitted into the valve housing 18. An output chamber 25 is defined between one end of the valve shaft 24 and the valve seat member 23. A valve sphere 26 is secured to one end of the valve shaft 24 and capable of being seated on a valve seat 23a formed on the valve seat member 23 to face the output chamber 25. Moreover, a return spring 27 for biasing the valve shaft 24, i.e., the valve sphere 26 in a direction away from the valve seat member 23 is mounted between the one end of the valve shaft 24 and the valve seat member 23.

A filter 29 is mounted in the valve housing 18 such that it is interposed between a fluid pressure passage 28 provided in the support block 16 to lead to the first output fluid pressure passage 3 and the valve seat member 23. A filter 30 is mounted on an outer periphery of the valve housing 18 at a location facing the annular chamber 22. A passage 31 for permitting the output chamber 25 to lead to the annular chamber 22 through the filter 30 is provided in the valve housing 18. The annular chamber 22 leads to the wheel brake BA. A fluid pressure passage 32 for permitting the annular chamber 22 to lead to the wheel brake BA is provided in the support block 16. Further, the check valve 7A is disposed in the valve housing 18 between the valve seat member 23 and the filter 29, and adapted to be opened when the pressure in the fluid pressure passage 28 has been dropped to be lower than that in the annular chamber 22, thereby permitting the braking fluid in the annular chamber 22 to be returned toward the fluid pressure passage 28.

The solenoid section 14 includes a stationary core 35, an armature 36 coaxially connected to the other end of the valve shaft 24 in the valve section 15 and opposed to the stationary core 35, a guide tube 37 for guiding the movement of the armature 36 toward and away from the stationary core 35, a bobbin 38 surrounding the guide tube 37, a coil 39 wound around the bobbin 38, a magnetic path frame 40 surrounding the coil 39, and a coil-shaped spring 41 interposed between the magnetic path frame 40 and the bobbin 38.

The stationary core 35 is formed into a cylindrical shape and connected coaxially integrally to a central portion of one end of the valve housing 18. The guide tube 37 is formed of a non-magnetic material, e.g., a stainless steel into a thin bottomed cylindrical shape with one end formed as a semi-spherical closed end. A tip end of the stationary core 35 is fitted into the other end of the guide tube 37, and the other end of the guide tube 37 is secured to the stationary core, for example, by welding. Moreover, in a state in which the valve housing 18 has been mounted in the mounting bore 17, the guide tube 37 protrudes from the one surface 16a of the support block 16.

The bobbin 38 is formed of a synthetic resin to have a center bore 38a through which the guide tube 37 is inserted, and the coil 39 is wound around the bobbin 38.

The magnetic path frame 40 includes a magnetic path tube 42 surrounding the bobbin 38 and the coil 39. A ring-shaped magnetic path plate 43 is engaged by crimping with one end of the magnetic path tube 42 to abut against the bobbin 38, so that the closed end of the guide tube 37 protrudes from a central portion of the magnetic path plate 43.

On the other hand, a ring-shaped abutment plate portion 42a is integrally connected to the other end of the magnetic path tube 42 to abut against one end of the valve housing 18 around the stationary core 35. A base portion of the stationary core 35 is fitted to an inner periphery of the abutment plate portion 42a. The coil-shaped spring 41 is mounted so that one end abuts against the abutment plate portion 42a and the other end abuts against the bobbin 38.

The armature 36 capable of moving toward and away from the stationary core 35 is accommodated in the guide tube 37. One end of the valve shaft 24 movably passed through the stationary core 35 abuts coaxially against the armature 36. The valve shaft 24 is biased in a direction to move the valve sphere 26 away from the valve seat member 23. The other end of the valve shaft 24 is always in abutment against the armature 36, so that the valve shaft 24, i.e., the valve sphere 26 is also moved axially in response to the axial movement of the armature 36.

Namely, in a state in which no magnetic attracting force toward the stationary core 35 is applied to the armature 36, the armature 36 is retracted by a spring force of the return spring 27 to a location in which it is received by one closed end of the guide tube 37. In this case, the valve sphere 26 is spaced apart from the valve seat member 23, and the normally-opened solenoid valve 5A is in the opened state. When the armature 36 is magnetically attracted toward the stationary core 35 until the valve sphere 26 is seated on the valve seat member 23, the normally-opened solenoid valve 5A is brought into the closed state.

A combined force of a fluid pressure force provided by the fluid pressure in the output chamber 25 and the spring force of the return spring 27 is applied to one end of the valve shaft 24. A magnetic attracting force for attracting the armature 36 toward the stationary core 35 is applied to the other end of the valve shaft 24. Therefore, the valve shaft 24 is operated in a stroke manner so that the combined force of the fluid pressure force and the spring force is balanced with the magnetic attracting force. Then, the magnetic attracting force for attracting the armature 36 toward the stationary core 35 can be changed by controlling the amount of electric current supplied to the coil 39, for example, by a duty control, so that it assumes the middle value between the turning-on value and the turning-off value.

On the other hand, each of opposed surfaces 35a and 36a of the stationary core 35 and the armature 36 is formed into a tapered surface whose diameter is increasing as it goes away from the output chamber 25.

If the opposed surfaces 35a and 36a of the stationary core 35 and the armature 36 are formed into the tapered surfaces, as described above, the change in distance between the stationary core 35 and the armature 36 opposed to each other (distance in a direction perpendicular to the tapered surfaces) can be decreased, as compared with the amount of the axial stroke of the armature 36, and the change in attracting force generated between the opposed surfaces 35a and 36a is decreased relative to the change in the axial stroke. Moreover, an actual attracting force applied axially is a sin component of the attracting force generated between the opposed surfaces 35a and 36a, so that the more acute the angle of the tapered surfaces is, the smaller the change in axial attracting force is with respect to the change in attracting force between the opposed surfaces 35a and 36a.

Figure 3:
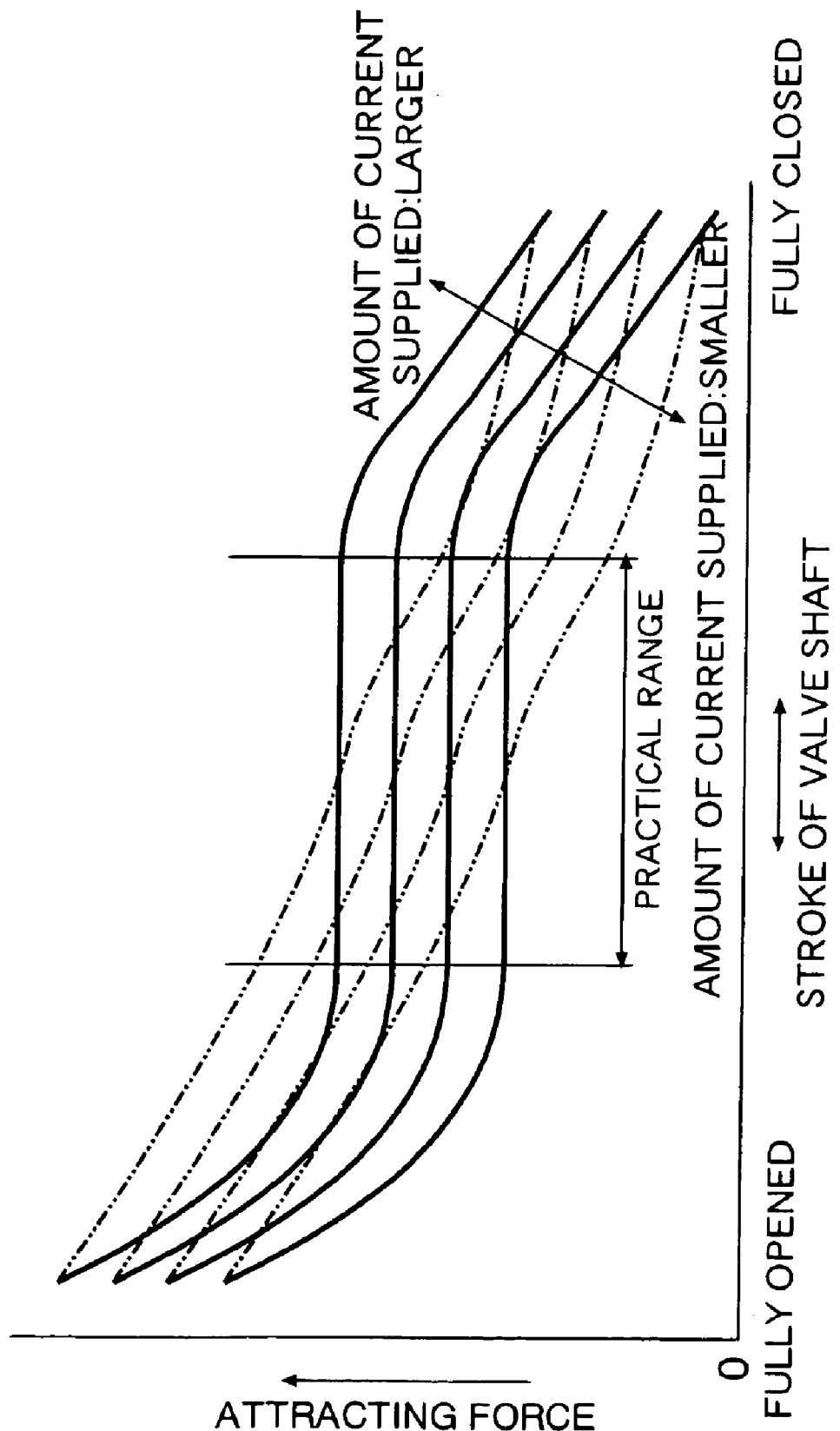

Thus, the attracting force between the stationary core 35 and the armature 36 can be substantially flattened in a practical use range between the full closing and the full opening in the valve section 15, as shown by a solid line in FIG. 3. In contrast, if the opposed surfaces of the stationary core 35 and the armature 36 are formed as flat surfaces perpendicular to the axial direction, the opposed distance between the stationary core 35 and the armature 36 proportionally changes in accordance with the axial stroke of the valve shaft 24, so that the attracting force between the stationary core 35 and the armature 36 largely changes also in the practical use range, as shown by a dashed line in FIG. 3.

In this manner, the normally-opened solenoid valve 5A is capable of being controlled in the turned-on/off manner, and also controlled at the electric current having the middle value between the turning-on value and the turning-off value thereby linearly changing the fluid pressure for the wheel brake BA. The other normally-opened solenoid valves 5B to 5D are also constructed as in the normally-opened solenoid valve 5A. On the other hand, the normally-closed solenoid valves 6A to 6D are only controlled in a turned-of/off manner.

Figure 4:
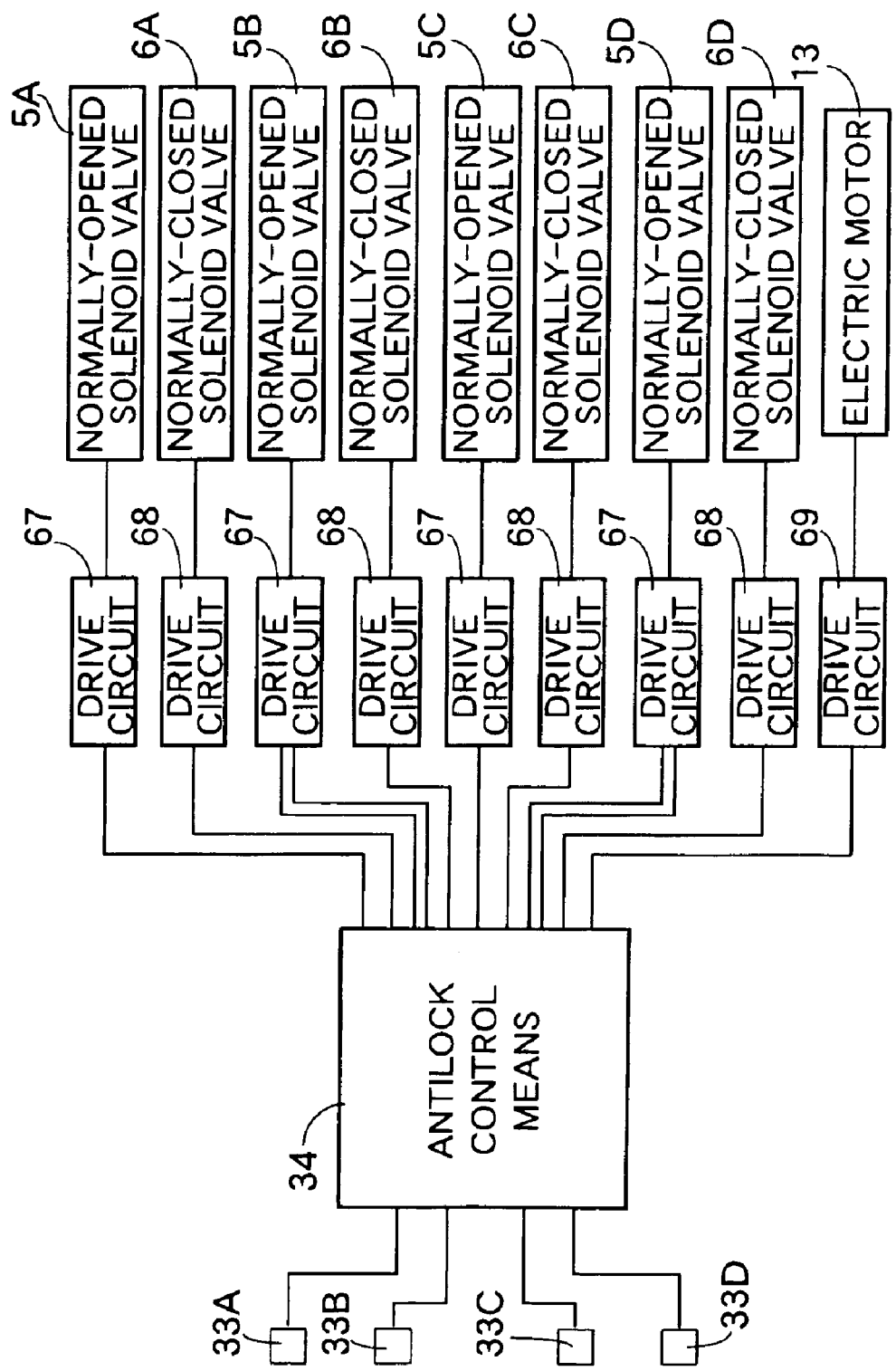

Referring to FIG. 4, the normally-opened solenoid valves 5A to 5D are driven by a drive circuits 67; the normally-closed solenoid valves 6A to 6D are driven by drive circuits 68; and the electric motor 13 is driven by a drive circuit 69. The drive circuits 67, 68 and 69 are controlled by an antilock control means 34, based on wheel speeds detected by wheel speed sensors 33A, 33C; 33B, 33D for detecting wheel speeds of the wheels respectively.

Figure 5:
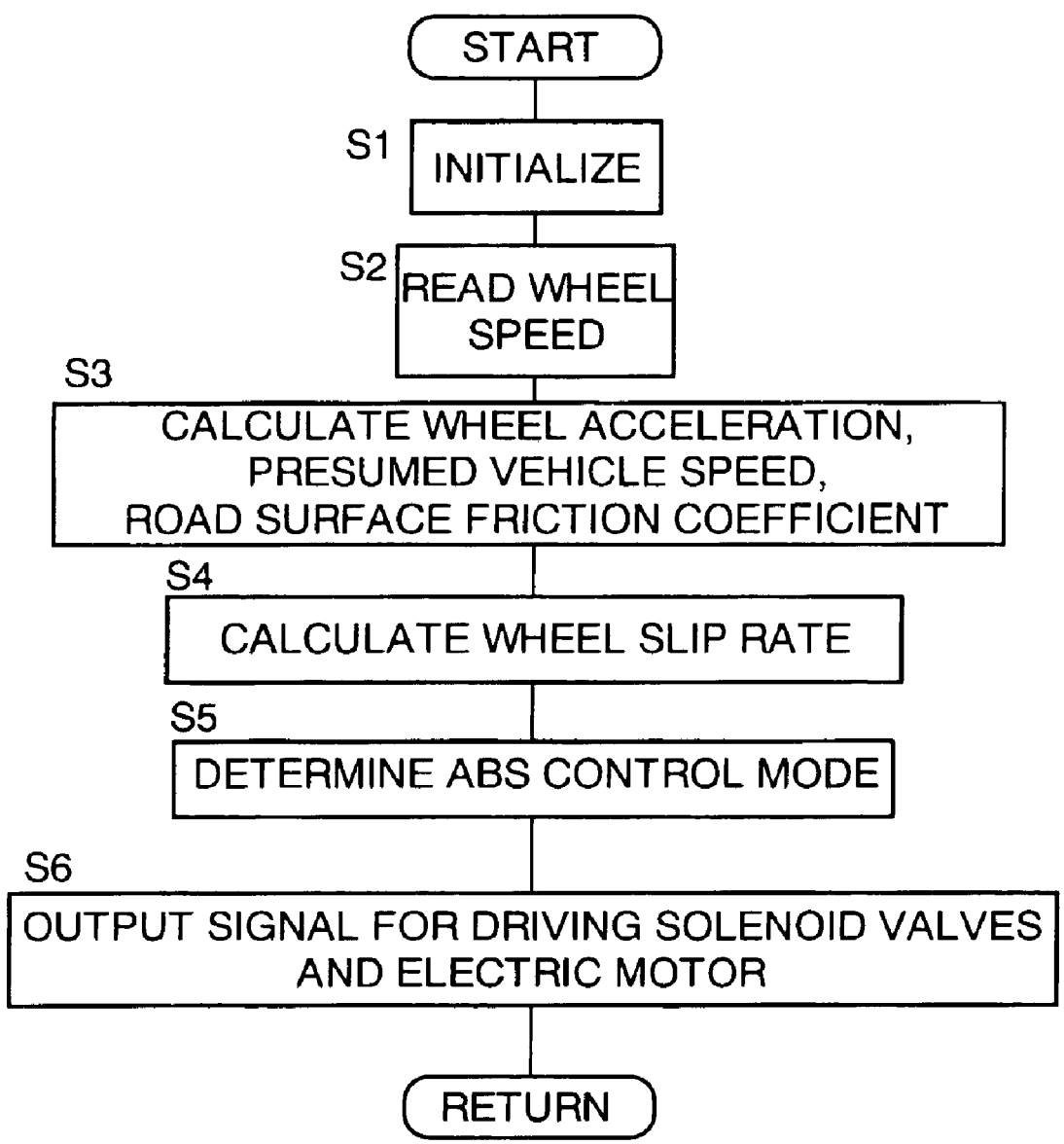

The antilock control means 34 carries out the antilock brake control for the wheel brakes BA to BD according to a procedure shown in FIG. 5. After completion of the initialization at Step S1, wheel speeds detected by the wheel speed sensors 33A, 33C; 33B, 33D are read at Step S2, and wheel accelerations, a presumed vehicle speed and a road surface friction coefficient are calculated based on the read wheel speeds at Step S3.

At Step S4, a slip rate for each of the wheels is calculated, and it is determined at Step S5 which control mode the antilock brake control should perform, i.e., it should enter a pressure-reducing state, a pressure-maintaining state or a pressure-increasing state. A control signal for controlling the drive circuits 67, 68 and 69 is output based on the determination at Step S6.

In this manner, the antilock control means 34 is adapted to determine a tendency in the locking of each wheel based on the wheel speeds detected by the wheel speed sensors 33A to 33D, and to control the supply of electric current to the normally-opened solenoid valves 5A to 5D, the normally-closed solenoid valves 6A to 6D and the electric motor 13 in accordance with the result of the determination. Table 1 shows control modes for supply of electric current to the normally-opened solenoid valves 5A to 5D and the normally-closed solenoid valves 6A to 6D.

TABLE 1

|  | Stop | Pressure-increasing | | Pressure-maintaining | | Pressure-reducing |
|---|---|---|---|---|---|---|
|  |  | Pressure-increasing | Duty Pressure-increasing | Duty Pressure-maintaining | Pressure-maintaining |  |
| Normally-opened Valve | Turned-off State | Turned-off State | Middle State | Middle State | Turned-on State | Turned-on State |
| Normally-closed Valve | Turned-off State | Turned-off State | Turned-off State | Turned-off State | Turned-off State | Turned-on State |

In Table 1, the duty pressure-increasing and the duty pressure-maintaining indicate states in which the normally-opened solenoid valves 5A to 5D are controlled at an electric current having a middle value between a turning-on value and a turning-off value, to increase the braking fluid pressure and to maintain the braking fluid pressure, i.e., middle states between a turned-on state and a turned-off state. To control the supply of the electric current to the normally-opened solenoid valves 5A to 5D, the antilock control means 34 switches the state of each of the normally-opened solenoid valves over the turned-on state in which a predetermined first electric current is permitted to flow through the coil 39, the turned-off state in which the supply of the electric current is stopped, and the middle state in which a second electric current lower than the first electric current is permitted to flow (the duty pressure-increasing state and the duty pressure-maintaining state).

Figure 6:
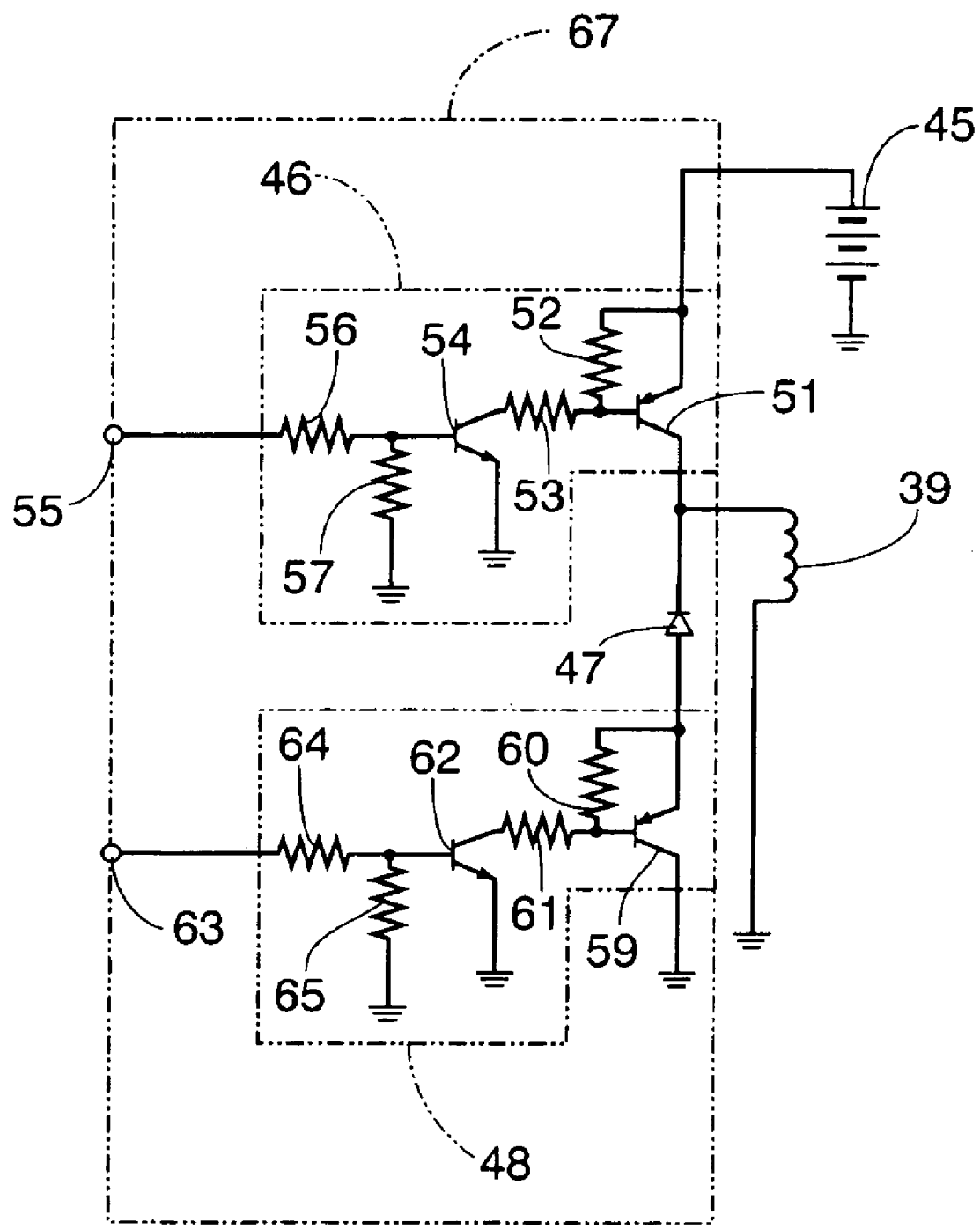

Referring to FIG. 6, each of the drive circuits 67 for the normally-opened solenoid valves 5A to 5D includes a current supply control means 46 provided between a power source 45 and the coil 39 to control the supply and cutting-off of the electric current to the coil 39, a diode 47 connected to the current supply control means 46 to bypass the coil 39, while permitting the flowing of the electric current toward the power source 45, and a switch means 48 mounted between the diode 47 and an earth so as to invalidate the function of the diode 47 when it is turned off.

The current supply control means 46 includes a PNP transistor 51 whose emitter is connected to the power source. 45, resistors 52, 53 and an NPN transistor 54 connected in series between the power source 45 and the earth, and resistors 56 and 57 connected in series between a control signal input terminal 55 and the earth. A connection point between the resistors 52 and 53 is connected to a base of the PNP transistor 51. A connection point between the resistors 56 and 57 is connected to a base of the NPN transistor 54.

In such current supply control means 46, the NPN transistor 54 is brought into a conduction state in response to the input of a high-level control signal to the control signal input terminal 55, whereby the PNP transistor 51 is brought into a conduction state.

The coil 39 is mounted between a collector of the PNP transistor 51 and the earth. The diode 47 is mounted between the collector of the PNP transistor 51 and the earth so as to permit the flowing of the electric current toward the power source 45.

The switch means 48 includes a PNP transistor 59 whose emitter is connected to the diode 47, resistors 60, 61 and an NPN transistor 62 connected in series between the diode 47 and the earth, and resistors 64 and 65 connected in series between the control signal input terminal 63 and the earth.

A connection point between the resistors 60 and 61 is connected to a base of the PNP transistor 59. A connection between the resistors 64 and 65 is connected to a base of the NPN transistor 62.

In such a switch means 48, the NPN transistor 62 is brought into a conduction state in response to the input of the high-level control signal from the antilock control means 34 to the control signal input terminal 63, whereby the PNP transistor 59 is brought into a conduction state.

A command signal for driving the normally-opened solenoid valves 5A to 5D during the antilock brake control to open and close them changes, for example, as shown in FIG. 7, and the wheel speeds and the braking fluid pressure change in accordance with the change in the command signal. The command signal is constant so as to permit a constant electric current lower than the first electric current to flow through the coil 39 during the duty pressure-maintaining, and repeatedly increased and decreased in a predetermined range in order to provide an electric current lower than the first electric current during the duty pressure-increasing. A pulse signal is input to the control signal input terminals 55 of the drive circuits 67 from a PWM circuit (not shown) to which the command signal is input.

The diode 47 is adapted to slowly decrease the electric current flowing through the coil 39 upon the stoppage of the electric current supply to the coil 39. However, when the switch means 48 electrically connects the diode 47 and the earth to each other, the diode 47 exhibits the above-described function, but when the switch means 48 electrically disconnects the diode 47 and the earth from each other, the above-described function of the diode 47 is substantially invalidated.

Figure 8A:
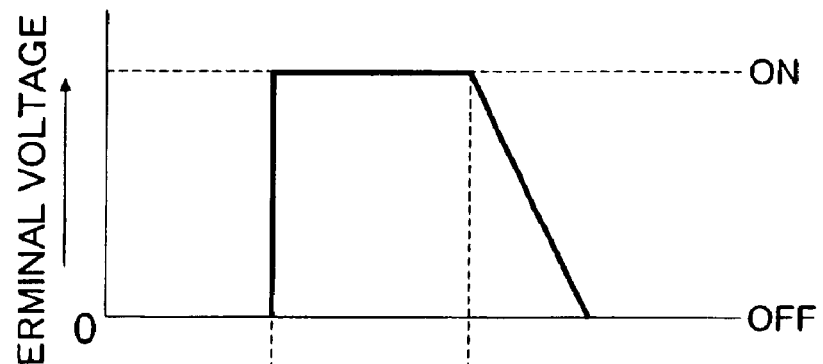
FIGS. 8A and 8B are diagrams each showing a change in voltage at a terminal of a coil provided by the electrical connecting and disconnecting operations of a switch means.
Figure 8B:
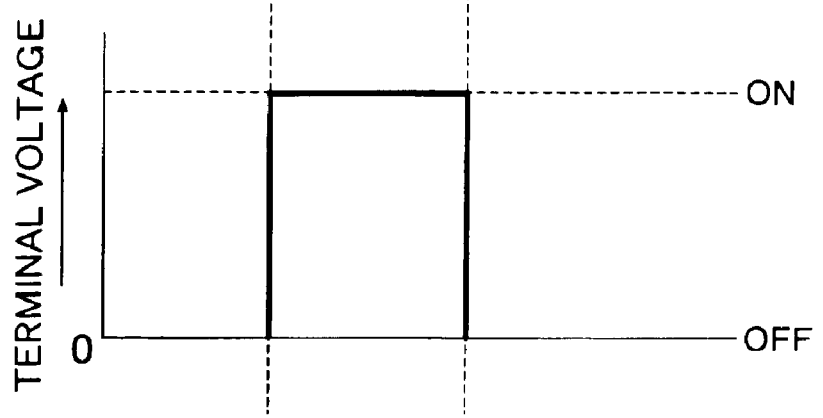

Namely, when the switch means 48 electrically connects the diode 47 and the earth to each other, the electric current flowing through the coil 39 is slowly decreased as shown in FIG. 8A upon the stoppage of the supply of the electric current to the coil 39, and when the switch means 48 electrically disconnects the diode 47 and the earth from each other, the electric current flowing through the coil 39 is quickly decreased as shown in FIG. 8B upon stoppage of the supply of the electric current.

Unlike the above-described drive circuits 67, the drive circuits 68 for the normally-closed solenoid valves 6A to 6D are arranged to simply switch over the supply and cutting-off of the electric current to coils (not shown) of the normally-closed solenoid valves 6A to 6D.

When the normally-opened solenoid valves 5A to 5D are shifted from the turned-on states to the middle states, the antilock control means 34 turns the switch means 48 off to thereby substantially invalidate the function of the diode 47 for a period from the start of the shifting to the completion of the shifting.

The operation of the first embodiment will be described below. The normally-opened solenoid valves 5A to 5D interposed between the master cylinder M and the wheel brakes BA to BD are capable of linearly changing the fluid pressures for the wheel brakes BA to BD. Therefore, it is possible to improve the feeling of the braking operation provided by the brake pedal P in such a manner that a kickback is not generated in the master cylinder M.

The normally-closed solenoid valves 6A to 6D interposed between the reservoirs 8A and 8B and the wheel brakes BA to BD are controlled in the turned-on/off manner, and capable of being closed during the linear control of the fluid pressure by the normally-opened solenoid valves 5A to 5D to thereby reliably prevent the leakage of the braking fluid, leading to an enhancement in accuracy of the control of the braking pressures for the wheel brakes BA to BD.

Each of the drive circuits 67 for driving the normally-opened solenoid valves 5A to 5D for the wheels includes the current supply control means 46 mounted between the power source 45 and the coil 39 to control the supply and cutting-off of the electric current to the coil 39, the diode 47 connected between the power source 45 and the earth to bypass the coil 39, and the switch means 48 mounted between the diode 47 and the earth. Therefore, the state in which diode 47 exhibits its function and the state in which the function of the diode 47 is substantially invalidated can be switched over from one to the other by switching over the electrically connecting and disconnecting states of the switch means 48 from one to the other.

Thus, the state in which the electric current flowing through the coil 39 is slowly decreased and the state in which the electric current flowing through the coil 39 is quickly decreased can be easily switched over from one to the other by switching over the electrical connecting and disconnecting states of the switch means 48 from one to the other. When each of the normally-opened solenoid valves 5A to 5D is shifted from the turned-on state to the middle state, i.e., when it is shifted from the turned-on state to the duty pressure-maintaining state, as shown by a solid line in FIG. 7, the switch means 48 is turned off at a time point t1, and when each of the normally-opened solenoid valves 5A to 5D is shifted from the turned-on state to the duty pressure-increasing state, as shown by a dashed line in FIG. 7, the switch means 48 is turned off at a time point t2. Until the shifting from the duty pressure-maintaining state to the duty pressure-increasing state is completed, the switch means 48 is maintained turned off, thereby substantially invalidating the function of the diode 47. Thus, it is possible to enhance the responsiveness during shifting of each of the normally-opened solenoid valves 5A to 5D from the turned-on state to the middle state.

Upon the completion of the above-described shifting, the time of response to the change in electric current to the coil 39 with respect to the change in input to the transistor 62 is concerned. However, while the control cycle is 5 m sec., the response time is as sufficiently short as 1 to 2 m sec., and hence the switch means is turned off by determining that the shifting has been completed after lapse of one control cycle after the switching-over to the duty pressure-maintaining state or the duty pressure-increasing state.

Figure 9:
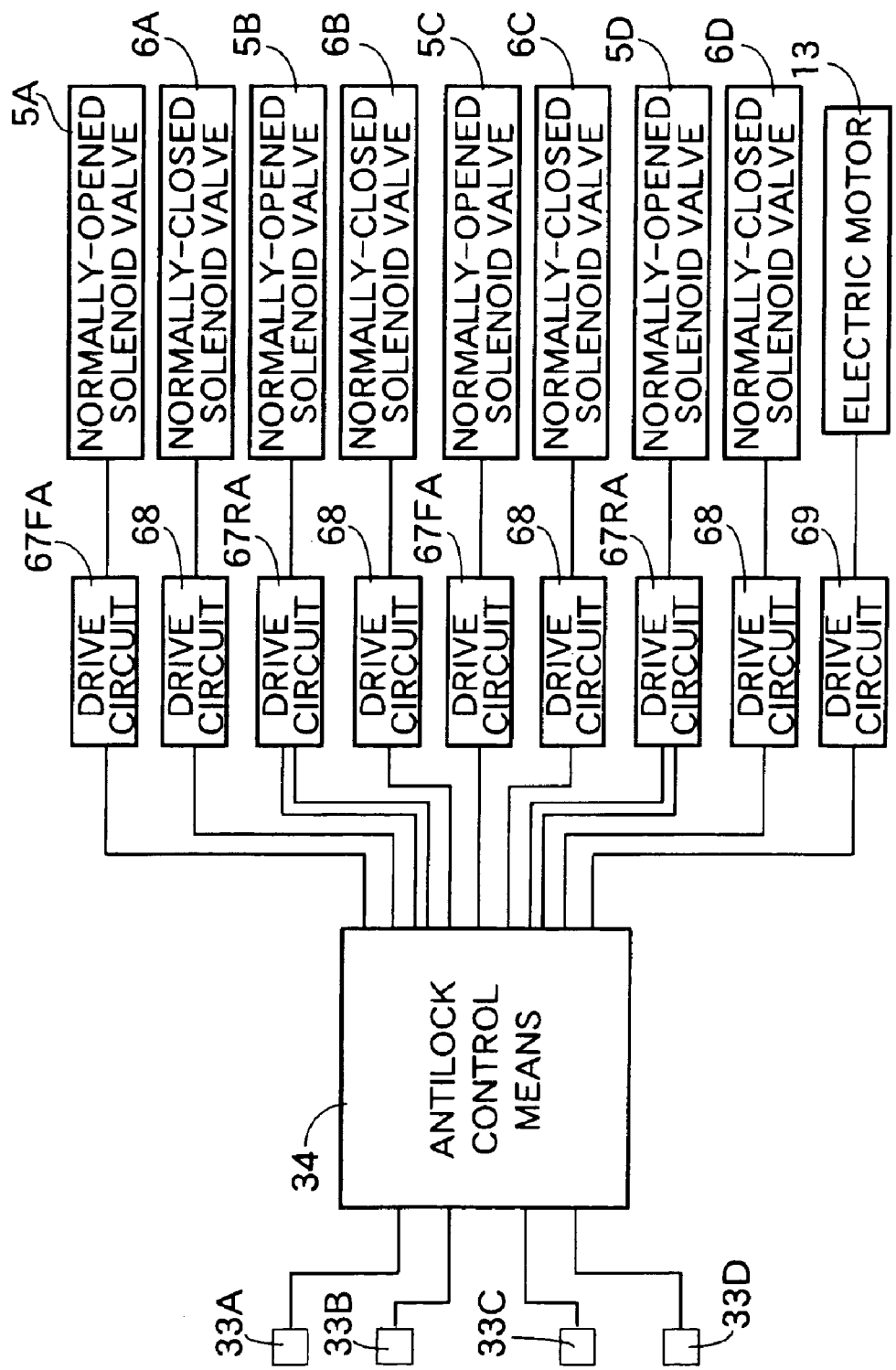

A second embodiment of the present invention will now be described with reference to FIGS. 9 to 11. Referring first to FIG. 9, normally-opened solenoid valves 5A and 5C corresponding to left and right front wheels are driven by drive circuits 67FA, 67FA, and normally-opened solenoid valves 5B and 5D corresponding to left and right rear wheels are driven by drive circuits 67RA, 67RA. The normally-closed solenoid valves 6A to 6D are driven by the drive circuits 68. The electric motor 13 is driven by the drive circuit 69. The drive circuits 67FA, 67RA, 68 and 69 are controlled by an antilock control means 34, based on wheel speeds detected by the wheel speed sensors 33A, 33C; 33B, 33D. Particularly, a turning-on/off signal for a switch means 48 which will be described hereinafter is supplied from the antilock control means 34 to the drive circuits 67RA.

The antilock control means 34 is adapted to determine a tendency in the locking of each wheel, based on wheel speeds detected by the wheel speed sensors 33A to 33D, and to control the supply of an electric current to the normally-opened solenoid valves 5A to 5D, the normally-closed solenoid valves 6A to 6D and the electric motor 13 depending on the result of the determination. In this case, the supply of the electric current to the normally-opened solenoid valves 5A to 5D and the normally-closed solenoid valves 6A to 6D is controlled by the antilock control means 34 so that antilock brake controls for the front wheels and the rear wheels are carried out independently from each other.

Figure 10:
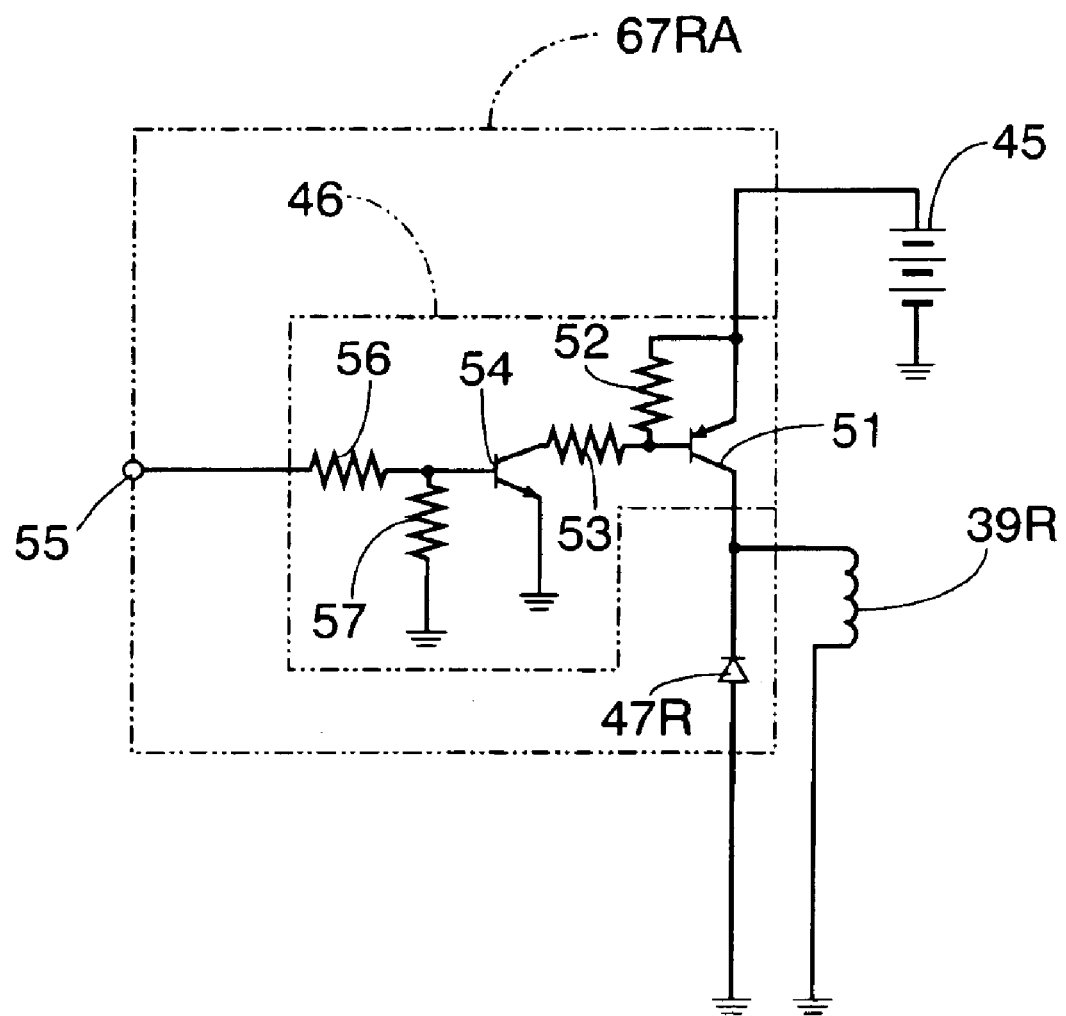

Referring to FIG. 10, the drive circuit 67RA for the normally-opened solenoid valves 5B and 5D corresponding to the left and right rear wheels includes a current supply control means 46 mounted between a power source 45 and a coil 39R to control the supply and cutting-off of the electric current to the coil 39R, and a diode 47R capable of exhibiting a function of slowly decreasing the electric current supplied to the coil 39R, when the supply of the electric current to the coil 39R has been cut off by the current supply control means 46.

The current supply control means 46 includes: a PNP transistor 51 whose emitter is connected to the power source 45; resistors 52, 53 and an NPN transistor 54 connected in series between the power source 45 and an earth; and resistors 56 and 57 connected in series between a control signal input terminal 55 and the earth. A connection point between the resistors 52 and 53 is connected to a base of the PNP transistor 51. A connection point between the resistors 56 and 57 is connected to a base of the NPN transistor 54.

In such current supply control means 46, the NPN transistor 54 is brought into a conduction state in response to the input of a high-level control signal to the control signal input terminal 55, whereby the PNP transistor 51 is brought into a conduction state.

The coil 39R is mounted between a collector of the PNP transistor 51 and the earth. The diode 47 is mounted between the collector of the PNP transistor 51 and the earth so as to permit the flowing of the electric current toward the power source 45.

Figure 11:
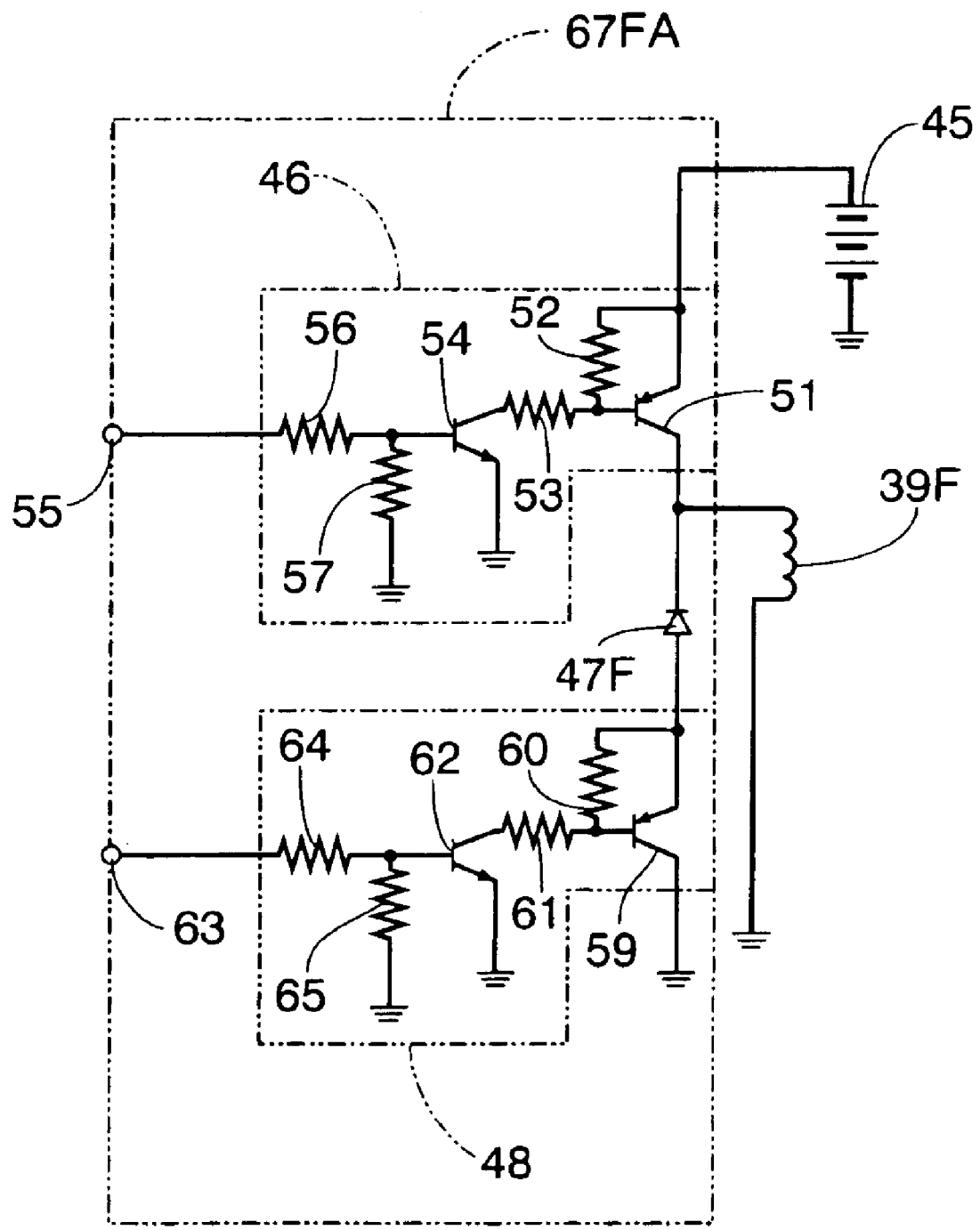

Referring to FIG. 11, the drive circuit 67FA for the normally-opened solenoid valves 5A and 5C corresponding to the left and right front wheels includes a current supply control means 46 mounted between the power source 45 and the coil 39F to control the supply and cutting-off of the electric current to the coil 35F, a diode 47F connected to the current supply control means 46 to bypass the coil 39F, while permitting the flowing of the electric current toward the power source 45, and a switch means 48 connected in series between the diode 47F and the earth so as to invalidate the function of the diode 47F when it is turned off.

The diode 47F is adapted to slowly decrease the electric current flowing through the coil 39F during stoppage of the supply of the electric current to the coil 39F. However, when the switch means 48 electrically connects the diode 47F and the earth to each other, the diode 47F exhibits the above-described function, but when the switch means 48 electrically disconnects the diode 47F and the earth from each other, the above-described function of the diode 47F is substantially invalidated.

According to the second embodiment, each of the drive circuit 67FA for driving the normally-opened solenoid valves 5A and 5C corresponding to the left and right front wheels includes the current supply control means 46 mounted between the power source 45 and the coil 39F to control the supply and cutting-off of the electric current to the coil 39F, the diode 47F connected between the power source 45 and the earth to bypass the coil 39F, and the switch means 48 connected between the diode 47F and the earth. Therefore, a state in which the diode 47F exhibits its function and a state in which the function of the diode 47F is substantially invalidated can be switched over from one to the other by switching over the electrically connecting and disconnecting states of the switch means 48 from one to the other.

Thus, the state in which the electric current flowing through the coil 39 is slowly decreased and the state in which the electric current flowing through the coil 39 is quickly decreased can be easily switched over from one to the other by switching over the electrical connecting and disconnecting states of the switch means 48 from one to the other. Thus, it is possible to simultaneously achieve the smooth control operation in a state in which the amount of electric current supplied to the coil 39F is controlled at a middle value between a turning-on value and a turning-ff value to linearly control the fluid pressure for the left front and right front wheel brakes BA and BC, as well as the control operation for quickly shifting the solenoid valves from the turned-on states (closed states) to the turned-off states (opened states).

Moreover, the switch means 48 are connected in series to only the diodes 47F individually corresponding to the left and right front wheels, and hence it is possible to enhance the responsiveness of the control of the braking fluid pressures in the left and right front wheel brakes BA and BC which receive a heavy load and whose fluid pressures are controlled independently from those for the rear wheels, by bringing the switch means 48 into the turned-off state to substantially invalidate the functions of the diodes 47F, while minimizing an increase in the number of circuits for a signal output from the antilock control means 34.

Figure 12:
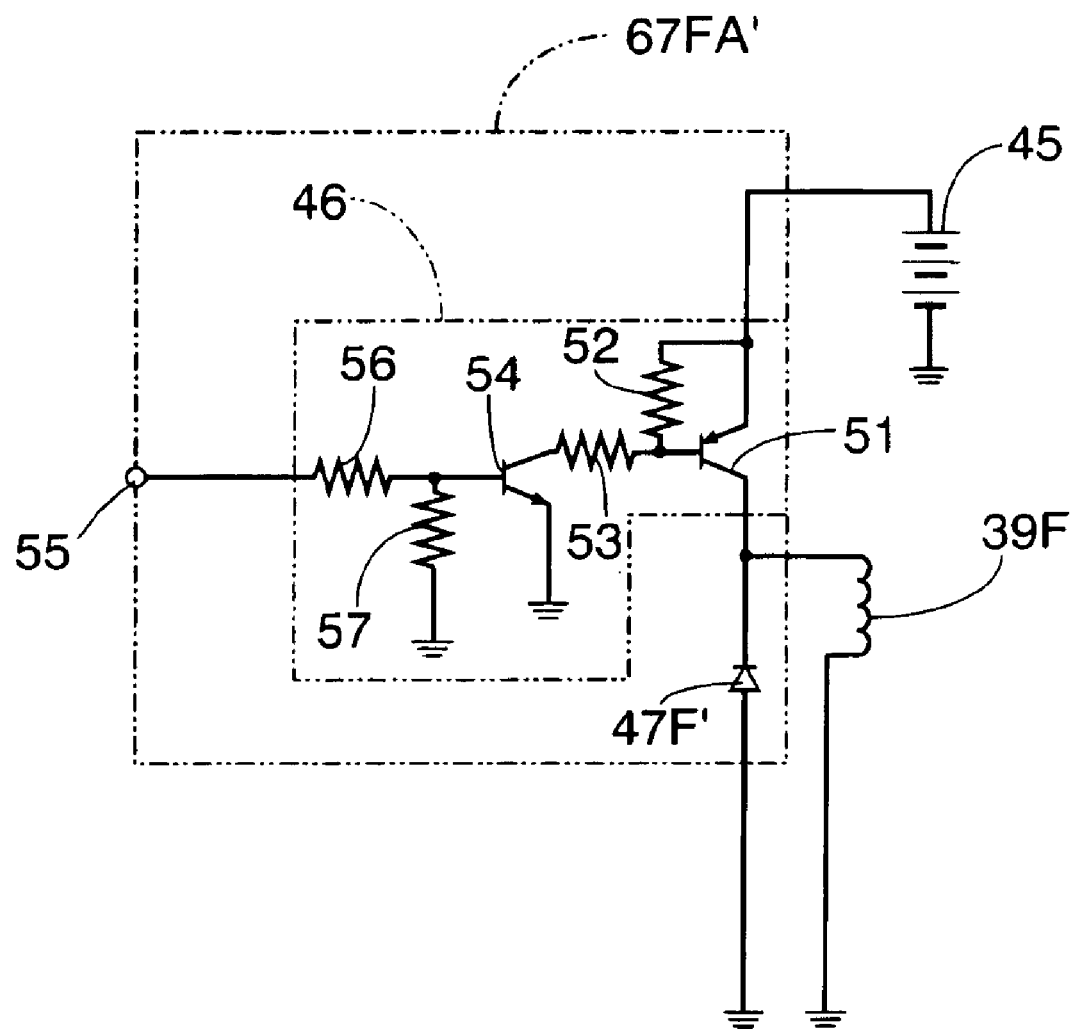
FIG. 12 is a diagram similar to FIG. 10, but according to a third embodiment.

FIG. 12 shows a third embodiment of the present invention. In the third embodiment, a drive circuit 67FA' for each of normally-opened solenoid valves 5A and 5C (see the first embodiment) corresponding to left and right front wheels includes a current supply control means 46 mounted between a power source 45 and a coil 39F to control the supply and cutting-off of electric current to the coil 39F, and a diode 47F' connected in series to the coil 39F so as to exhibit a function of slowly decreasing the electric current supplied to the coil 39F when the supply of electric current to the coil 39F has been cut off by the current supply control means 46. In this third embodiment, the switch means 48 mounted in the second embodiment is eliminated.

Moreover, the diode 47F' connected in series to the coil 39F has a capacity which is set to be smaller than that of the diode 47R (see the second embodiment) connected in series to the coil 39R of each of the normally-opened solenoid valves 5B and 5D individually corresponding to the left and right rear wheels.

According to the third embodiment, the capacity of the diode 47F' for each of the left and right front wheels is set at the relatively small value. Therefore, in the coil 39F of each of the normally-opened solenoid valves 5A and 5C corresponding the left and right front wheel brakes BA and BC, a current-decreasing speed when the electric current flowing through the coil 39F is slowly decreased by the diode 47F' upon the stoppage of the supply of the electric current to the coil 39F is high as compared with that in the diode having a larger capacity. Thus, it is possible to enhance the responsiveness of the control of the braking fluid pressure for the front wheels receiving a heavy load.

In the second and third embodiments, the antilock control means 34 carries out the antilock brake controls independently for the front wheels and the rear wheels, but in a fourth embodiment, an antilock control means 34 simultaneously carries out select-low controls for left and right rear wheels during an antilock brake control. This fourth embodiment will be described below with reference to FIGS. 13 to 15.

Figure 13:
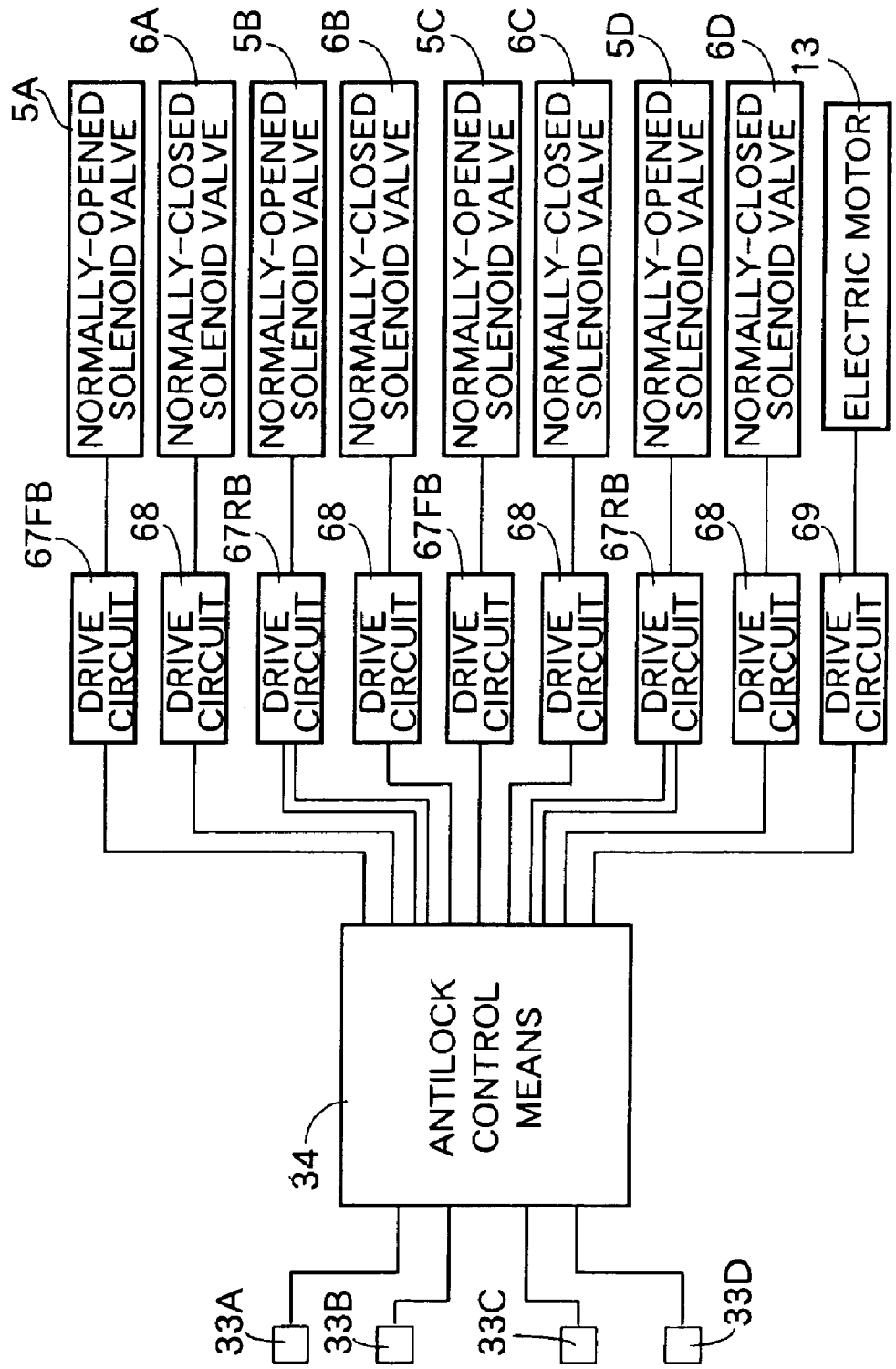

Referring first to FIG. 13, normally-opened solenoid valves 5A and 5C corresponding to left and right front wheels are driven by drive circuits 67FB, 67FB; normally-opened solenoid valves 5B and 5D corresponding to left and right rear wheels are driven by drive circuits 67RB, 67RB; the normally-closed solenoid valves 6A to 6D are driven by the drive circuits 68; and the electric motor 13 is driven by the drive circuit 69. The drive circuits 67FB, 67RB, 68 and 69 are controlled by an antilock control means 34, based on wheel speeds detected by the wheel speed sensors 33A, 33C; 33B, 33D for detecting wheel speeds of the wheels, respectively. Particularly, a turning-on/off signal for a switch means 48 which will be described hereinafter is supplied from the antilock control means 34 to the drive circuits 67RB.

The antilock control means 34 is adapted to determine a tendency in the locking of each wheel, based on the wheel speeds detected by the wheel speed sensors 33A to 33D and to control the supply of an electric current to the normally-opened solenoid valves 5A to 5D, the normally-closed solenoid valves 6A to 6D and the electric motor 13 in accordance with the result of the determination, but is adapted to carry out select-low controls simultaneously for the left and right rear wheels. Namely, the normally-opened solenoid valves 5B and 5D and the normally-closed solenoid valves 6B and 6D corresponding to the left and right rear wheels are controlled simultaneously in such a manner that the right rear wheel brake BB and the left rear wheel brake BD are subjected to the antilock brake control in response to the situation in which one of the left and right rear wheels assumes a locking tendency.

Figure 14:
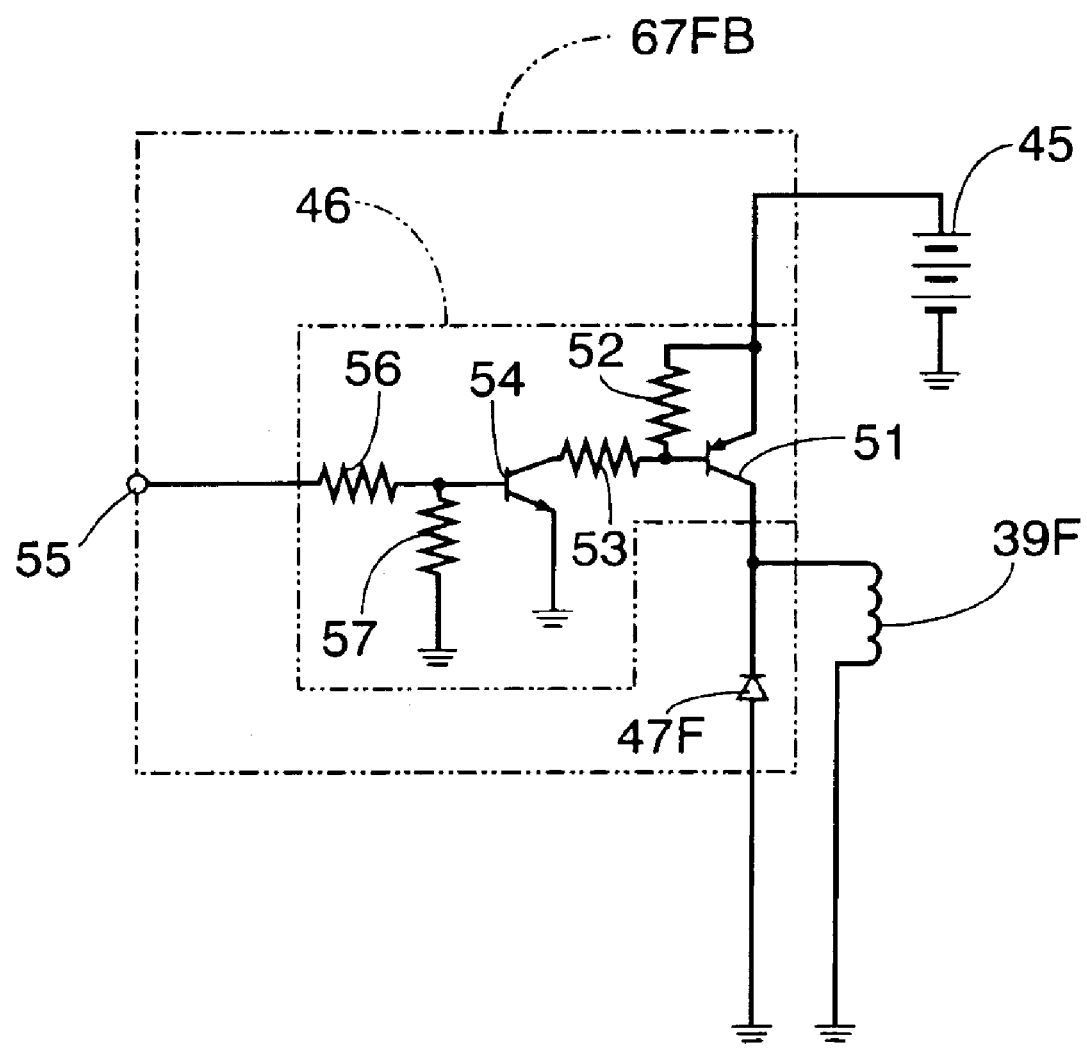

Referring to FIG. 14, the drive circuit 67FB for each of the normally-opened solenoid valves 5A and 5C corresponding to the left and right front wheels includes a current supply control means 46 mounted between a power source 45 and a coil 39F so that it is connected in series to the coil 39F, and a diode 47F adapted to exhibit a function of slowly decreasing the electric current supplied to the coil 39F when the supply of the electric current to the coil has been cut off by the current supply control means 46.

Figure 15:
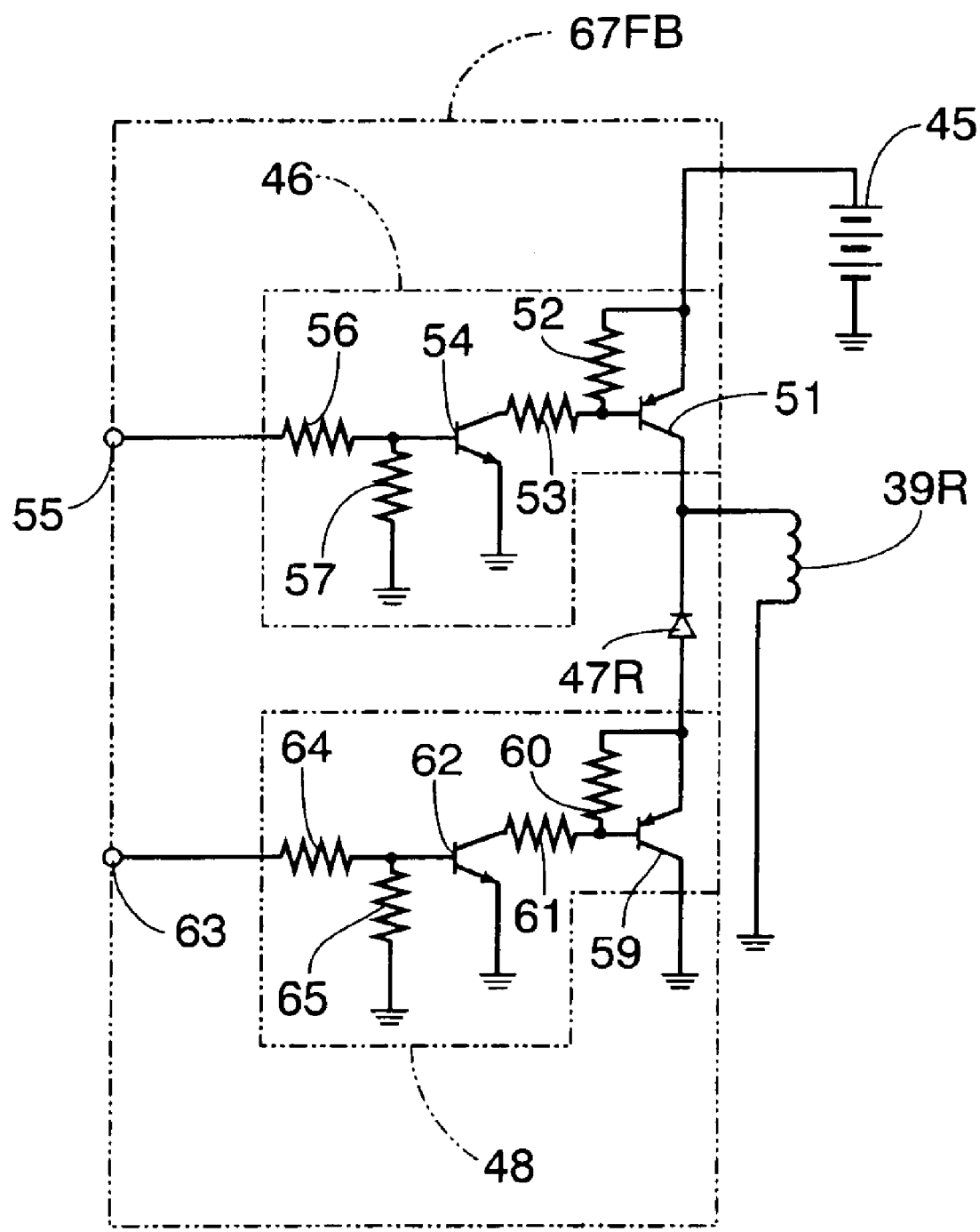

Referring to FIG. 15, the drive circuit 67RB for each of the normally-opened solenoid valves 5B and 5D corresponding to the left and right rear wheels includes a current supply control means 46 mounted between the power source 45 and a coil 39R to control the supply and cutting-off of the electric current to the coil 39R, a diode 47R connected to the current supply control means 46 to bypass the coil 39R, while permitting the flowing of the electric current toward the power source 45, and a switch means 48 connected in series between the diode 47R and an earth so as to invalidate the function of the diode 47R when it is turned off.

The diode 47R is adapted to slowly decrease the electric current flowing through the coil 39R when the supply of the electric current to the coil 39R has been stopped. However, when the switch means 48 electrically connects the diode 47R and the earth to each other, the diode 47R exhibits the above-described function, but when the switch means 48 electrically disconnects the diode 47R and the earth from each other, the above-described function of the diode 47R is substantially invalidated.

According to the fourth embodiment, each of the drive circuits 67RB for driving the normally-opened solenoid valves 5B and 5D corresponding to the left and right rear wheels includes a current supply control means 46 mounted between the power source 45 and the coil 39R to control the supply and cutting-off of the electric current to the coil 39R, a diode 47R connected between the power source 45 and the earth to bypass the coil 39R, and a switch means 48 mounted between the diode 47R and the earth. Therefore, a state in which the diode 47R exhibits its function and a state in which the function of the diode 47R is substantially invalidated can be switched over from one to the other by switching over the electrical connecting and disconnecting states of the switch means 48 from one to the other.

Thus, a state in which the electric current flowing through the coil 39R is slowly decreased and a state in which the electric current flowing through the coil 39R is quickly decreased can be easily switched over from one to the other by switching over the electrical connecting and disconnecting states of the switch means 48 from one to the other. Thus, it is possible to simultaneously achieve the smooth control operation in a state in which the amount of electric current supplied to the coil 39F is controlled at a middle value between a turning-on value and a turning-ff value to linearly control the fluid pressure for the left front and right rear wheel brakes BB and BD, as well as the control operation for quickly shifting the solenoid valves from the turned-on states (closed states) to the turned-off states (opened states).

Moreover, the switch means 48 are connected in series to only the diodes 47F individually corresponding to the left and right rear wheels, and hence the switch means 48 can be brought into the turned-off states to substantially invalidate the functions of the diodes 47F, while minimizing an increase in the number of circuits for signals output from the antilock control means 34. Thus, it is possible to enhance the responsiveness of the braking fluid pressure control in the left and right rear wheel brakes BA and BC subjected to select-low controls simultaneously, and to suppress the generation of the imbalance between the braking fluid pressures of the left and right rear wheel brakes BB and BD.

Figure 16:
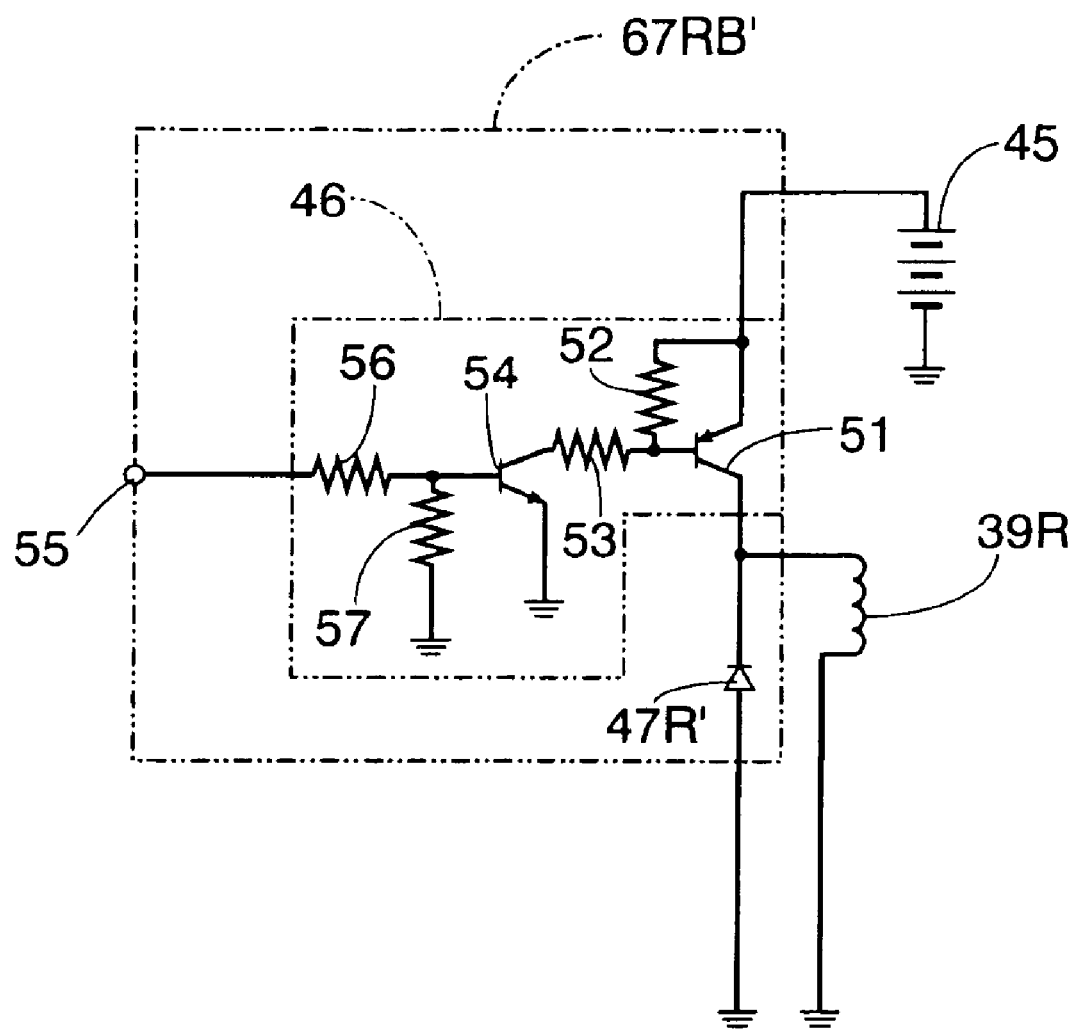
FIG. 16 is a diagram showing the arrangement of a drive circuit for normally-closed solenoid valves corresponding to rear wheels according to a fifth embodiment of the present invention.

FIG. 16 shows a fifth embodiment of the present invention. In the fifth embodiment, a drive circuit 67RB' for each of normally-opened solenoid valves 5B and 5D (see the first embodiment) corresponding to left and right rear wheels includes a current supply control means 46 mounted between a power source 45 and a coil 39R to control the supply and cutting-off of electric current to the coil 39R, and a diode 47R' connected in series to the coil 39R so as to exhibit a function of slowly decreasing the electric current supplied to the coil 39R when the supply of electric current to the coil 39R has been cut off by the current supply control means 46. In this fifth embodiment, the switch means 48 mounted in the fourth embodiment is eliminated.

Moreover, the diode 47R' connected in series to the coil 39R has a capacity which is set to be smaller than that of a diode 47F (see the second embodiment) connected in series to a coil 39F of each of normally-opened solenoid valves 5A and 5C individually corresponding to left and right front wheels.

According to the fifth embodiment, the capacity of the diode 47R' for each of the left and right front wheels is set at the relatively small value. Therefore, in the coil 39R of each of the normally-opened solenoid valves 5B and 5D corresponding the left and right rear wheel brakes BB and BD, a current-decreasing speed when the electric current flowing through the coil 39R is slowly decreased by the diode 47R' upon the stoppage of the supply of the electric current to the coil 39R is high as compared with that in the diode having a larger capacity. Moreover, a difference in capacity between the diodes 47R' individually corresponding to the left and right rear wheels is reduced. Thus, it is possible to suppress the generation of imbalance between the braking fluid pressures for the left and right rear wheel brakes BB and BD.

Although the embodiments of the present invention have been described in detail, it will be understood that the present invention is not limited to the above-described embodiments, and various modifications in design may be made without departing from the subject matter of the invention defined in the claims.

For example, the current supply control means 46 is mounted between the power source 45 and the coil 39F, 39R in each of the embodiments, but may be mounted between the coil 39F, 39R and the earth. In this case, the diode 47F, 47R, 47R' bypasses the coil 39F, 39R to connect the current supply control means 46 and the power source 45 to each other. In addition, the switch means 48 is mounted between the diode 47F, 47R, 47R' and the earth, but may be mounted between the current supply control means 46 and the diode 47F, 47R, 47R'.

What is claimed is:

1. An antilock brake control system for a vehicle, comprising: normally-opened solenoid valves interposed between wheel brakes and a braking fluid pressure generating means; normally-closed solenoid valves interposed between the wheel brakes and reservoirs; current supply control means connected in series to coils of the normally-opened solenoid valves to control the supply of electric current to the coils; diodes which bypass the coils and which connect the current supply control means and an earth to each other or connect a power source and the current supply control means to each other, while permitting the flowing of the electric current toward the power source; wheel speed sensors for detecting wheel speeds; and an antilock control means adapted to determine a tendency in the locking of each wheel based on wheel speeds detected by the wheel speed sensors and to control the supply of electric current to the normally-opened solenoid valves and the normally-closed solenoid valves in accordance with the result of the determination; the antilock control means being adapted to switch the state of each of the normally-opened solenoid valves over a turned-on state in which a predetermined first electric current is permitted to flow through the coil, a turned-off state in which the supply of the electric current to the coil is stopped, and a middle state in which a second electric current lower than the first electric current is permitted to flow through the coil, in the control of the supply of the electric current to the normally-opened solenoid valves, wherein the antilock brake control system further includes a switch means which is mounted between the diode and the current supply control means or between the diode and the earth, and whose electrical connecting and disconnecting operations are controlled by the antilock control means, and the antilock control means is adapted to maintain the switch means in an electrically disconnecting state during shifting of each of the normally-opened solenoid valves from the turned-on state to the middle state, until the shifting is completed.

2. An antilock brake control system for a vehicle, comprising: normally-opened solenoid valves which are interposed between wheel brakes respectively mounted on front wheels and rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves independently for the front wheels and the rear wheels in accordance with the result of the determination, wherein a switch means is connected in series to only the diodes which correspond to the normally-opened solenoid valves for the front wheels among the diodes individually corresponding to the normally-opened solenoid valves.

3. An antilock brake control system for a vehicle, comprising: normally-opened solenoid valves which are interposed between wheel brakes respectively mounted on front wheels and rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves independently for the front wheels and the rear wheels in accordance with the result of the determination, wherein the diode corresponding to each of the normally-opened solenoid valves for the front wheels has a capacity which is set at a value smaller than that of the diode corresponding to each of the normally-opened solenoid valves for the rear wheels.

4. An antilock brake control system for a vehicle, comprising: normally-opened solenoid valves which are interposed between wheel brakes respectively mounted on left and right front wheels and left and right rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves in such a manner to simultaneously carry out select-low controls for the left and right rear wheels in accordance with the result of the determination, wherein a switch means is connected in series to only those of the diodes individually corresponding to the normally-opened solenoid valves which individually correspond to the left and right rear wheels.

5. An antilock brake control system for a vehicle, comprising: normally-opened solenoid valves which are interposed between wheel brakes respectively mounted on left and right front wheels and left and right rear wheels and a braking fluid pressure generating means and which individually correspond to the wheel brakes; normally-closed solenoid valves which are interposed between the wheel brakes and reservoirs and which individually correspond to the wheel brakes; current supply control means connected in series to coils of the normally-opened solenoid valves respectively for controlling the supply and cutting-off of electric current to the coils; diodes which bypass the coils and which connect the current supply control means and an earth to each other or connect a power source and the current supply control means to each other, while permitting the flowing of electric current toward the power source; wheel speed sensors for detecting wheel speeds of the wheels, respectively; and an antilock control means adapted to determine a tendency in the locking of each wheel based on the wheel speeds detected by the wheel speed sensors and to control the supply of electric current to the normally-opened solenoid valves and the normally-closed solenoid valves in such a manner to simultaneously carry out select-low controls for the left and right rear wheels in accordance with the result of the determination, wherein each of the diodes individually corresponding to the normally-opened solenoid valves for the left and right rear wheels has a capacity which is set at a value smaller than that of each of the diodes individually corresponding to the normally-opened solenoid valves for the left and right front wheels.

* * * * *